United States Patent
Cross et al.

(10) Patent No.: US 11,706,241 B1
(45) Date of Patent: Jul. 18, 2023

(54) SECURITY MODEL UTILIZING MULTI-CHANNEL DATA

(71) Applicant: Wells Fargo Bank, N.A., San Francisco, CA (US)

(72) Inventors: Shane Cross, Matthews, NC (US); Daniel Fricano, San Francisco, CA (US); Thomas Gilheany, San Francisco, CA (US); Peter Makohon, San Francisco, CA (US); Dale Miller, San Francisco, CA (US); Charles Steven Edison, San Francisco, CA (US); Kodzo Wegba, San Francisco, CA (US); James Bonk, California, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 160 days.

(21) Appl. No.: 17/081,275

(22) Filed: Oct. 27, 2020

Related U.S. Application Data

(60) Provisional application No. 63/007,045, filed on Apr. 8, 2020.

(51) Int. Cl.
  *H04L 9/40* (2022.01)
  *H04L 43/045* (2022.01)
(52) U.S. Cl.
  CPC ........ *H04L 63/1433* (2013.01); *H04L 43/045* (2013.01); *H04L 63/1425* (2013.01); *H04L 63/18* (2013.01)
(58) Field of Classification Search
  CPC . H04L 63/1433; H04L 63/1425; H04L 63/18; H04L 43/045
  See application file for complete search history.

(56) References Cited

U.S. PATENT DOCUMENTS

| 7,284,274 B1 | 10/2007 | Walls et al. |
| 7,983,189 B2 | 7/2011 | Bugenhagen |

(Continued)

FOREIGN PATENT DOCUMENTS

| CN | 111756702 | 10/2020 |
| CN | 111865941 A * | 10/2020 |

(Continued)

OTHER PUBLICATIONS

Allodi & Massacci, "Security Events and Vulnerability Data for Cybersecurity Risk Estimation," Risk Analysis 37(8), pp. 1606-1627 (2017).

(Continued)

*Primary Examiner* — Sarah Su
(74) *Attorney, Agent, or Firm* — Foley & Lardner LLP

(57) ABSTRACT

Systems, methods and computer-readable storage media are utilized to analyze multi-channel data based on a security model in a computer network environment. A computing system is communicatively coupled to a plurality of data channels configured to access entity data via at least one data channel communication network. A plurality of data sources configured to store entity data are associated with the respective data channels. A processing circuit is communicatively coupled to a particular data channel via a data channel communication network and is structured to receive, via the data channel, entity data comprising device connectivity data, parse properties from the device connectivity data where the properties correspond to particular security dimensions, identify vulnerabilities associated with the properties, determine vulnerability impact, and generate a multi-dimensional risk score for a target computer network environment associated with the entity.

20 Claims, 11 Drawing Sheets

(56) References Cited

U.S. PATENT DOCUMENTS

| | | |
|---|---|---|
| 8,028,066 B2 | 9/2011 | Lewis |
| 8,121,049 B2 | 2/2012 | Lidstrom et al. |
| 9,166,999 B1 | 10/2015 | Kulkarni et al. |
| 9,294,498 B1 | 3/2016 | Yampolskiy et al. |
| 9,392,003 B2 | 7/2016 | Amsler |
| 9,401,851 B2 | 7/2016 | Kakadia et al. |
| 9,401,926 B1 | 7/2016 | Dubow et al. |
| 9,432,389 B1* | 8/2016 | Khalid ............... H04L 63/1425 |
| 9,686,150 B2 | 6/2017 | Gesmann |
| 9,686,308 B1 | 6/2017 | Srivastava |
| 9,703,851 B2 | 7/2017 | Ramesh et al. |
| 9,811,667 B2 | 11/2017 | Hugard et al. |
| 9,973,524 B2 | 5/2018 | Boyer et al. |
| 10,091,220 B2 | 10/2018 | Shabtai et al. |
| 10,198,581 B2* | 2/2019 | Sreenivas ............... G06F 21/57 |
| 10,218,736 B2 | 2/2019 | Ng et al. |
| 10,277,619 B1 | 4/2019 | Clark et al. |
| 10,360,525 B1 | 7/2019 | Milden et al. |
| 10,382,491 B2 | 8/2019 | Digiambattista et al. |
| 10,410,158 B1 | 9/2019 | Yumer et al. |
| 10,496,816 B2 | 12/2019 | Iyer et al. |
| 10,498,756 B2 | 12/2019 | Yampolskiy et al. |
| 10,515,328 B2 | 12/2019 | Rasumov |
| 10,530,666 B2 | 1/2020 | Venkitapathi et al. |
| 10,601,854 B2 | 3/2020 | Lokamathe et al. |
| 2010/0082379 A1 | 4/2010 | Chan et al. |
| 2012/0158944 A1 | 6/2012 | Tiwari et al. |
| 2012/0304300 A1 | 11/2012 | Ladumdard |
| 2013/0041713 A1 | 2/2013 | Henrich et al. |
| 2014/0181892 A1 | 6/2014 | Von Bokern et al. |
| 2014/0223464 A1 | 8/2014 | Moran et al. |
| 2014/0317730 A1 | 10/2014 | Ashley et al. |
| 2016/0171415 A1 | 6/2016 | Yampolskiy et al. |
| 2016/0380843 A1 | 12/2016 | Duncan et al. |
| 2018/0048534 A1 | 2/2018 | Danga et al. |
| 2018/0091558 A1 | 3/2018 | Daugherty et al. |
| 2018/0129989 A1 | 5/2018 | Bowers |
| 2018/0219833 A1 | 8/2018 | Reddy |
| 2018/0375735 A1 | 12/2018 | Hale |
| 2018/0375892 A1 | 12/2018 | Ganor |
| 2019/0222553 A1 | 7/2019 | Wu et al. |
| 2019/0253447 A1 | 8/2019 | Sweeney et al. |
| 2019/0306731 A1 | 10/2019 | Raghuramu et al. |
| 2020/0012796 A1* | 1/2020 | Trepagnier ............ G06K 9/6218 |
| 2020/0034762 A1 | 1/2020 | Rasumov |
| 2020/0034763 A1 | 1/2020 | Rasumov |
| 2020/0068031 A1 | 2/2020 | Kursun et al. |
| 2020/0076835 A1* | 3/2020 | Ladnai ................. G06F 21/562 |
| 2020/0076853 A1* | 3/2020 | Pandian ................. G16H 30/20 |
| 2020/0089887 A1 | 3/2020 | Luthra et al. |
| 2020/0092319 A1* | 3/2020 | Spisak ...................... G06N 7/00 |
| 2020/0097880 A1 | 3/2020 | Agarwal et al. |
| 2020/0195673 A1* | 6/2020 | Lee .......................... H04L 45/70 |
| 2020/0394309 A1 | 12/2020 | Angelo et al. |
| 2021/0014252 A1* | 1/2021 | Usher ................. H04L 63/1416 |
| 2021/0035116 A1 | 2/2021 | Derrington et al. |
| 2021/0044611 A1* | 2/2021 | Norrie ................... H04L 63/083 |
| 2021/0058422 A1* | 2/2021 | Obrecht ............. H04L 63/1425 |
| 2021/0099454 A1* | 4/2021 | Rahimi .................. H04L 63/12 |
| 2021/0136089 A1 | 5/2021 | Costea et al. |
| 2021/0176270 A1 | 6/2021 | Yampolskiy et al. |
| 2021/0194851 A1 | 6/2021 | Barton et al. |
| 2021/0203673 A1 | 7/2021 | Dos Santos et al. |
| 2021/0216928 A1 | 7/2021 | O'Toole et al. |
| 2021/0306341 A1 | 9/2021 | Tiwari et al. |
| 2021/0392154 A1* | 12/2021 | Waplington ........... G06N 20/00 |
| 2022/0035905 A1 | 2/2022 | Lu et al. |
| 2022/0129990 A1* | 4/2022 | Roudaut .............. H04L 63/1433 |
| 2022/0201009 A1* | 6/2022 | Dhoble ............... H04L 63/1416 |
| 2022/0261483 A1 | 8/2022 | Tam et al. |
| 2022/0292189 A1 | 9/2022 | Silderman et al. |
| 2023/0087052 A1 | 3/2023 | Korja et al. |

FOREIGN PATENT DOCUMENTS

| | | | |
|---|---|---|---|
| EP | 2 985 715 A1 | 2/2016 | |
| KR | 20220066114 | 3/2022 | |
| WO | WO-01/59989 A2 | 8/2001 | |
| WO | WO-2007/010541 A2 | 1/2007 | |
| WO | WO-2008/103286 A2 | 8/2008 | |
| WO | WO-2017/081639 A2 | 5/2017 | |
| WO | WO-2018/084808 A1 | 5/2018 | |
| WO | WO-2018/223235 A1 | 12/2018 | |
| WO | WO-2019/121043 A1 | 6/2019 | |
| WO | WO-2020/227335 A1 | 11/2020 | |
| WO | WO-2021/081516 A1 | 4/2021 | |
| WO | WO-2021082966 A1 * | 5/2021 | |
| WO | WO-2021/158227 | 8/2021 | |
| WO | WO-2021183939 A1 * | 9/2021 | ......... H04L 63/1425 |
| WO | WO-2021/202833 A1 | 10/2021 | |
| WO | WO-2021/243321 A1 | 12/2021 | |
| WO | WO-2022087510 A1 * | 4/2022 | |

OTHER PUBLICATIONS

Tavabi, et al., "Challenges in Forecasting Malicious Events from Incomplete Data," WWW'20: Companion Proceedings of the Web Conference 2020, pp. 603-610 (2020).

* cited by examiner

INTELLIGENCE — 605

| ITEM | DIMENSION | VALUE |
|---|---|---|
| DEFAULT FOR NEWLY DISCOVERED ITEMS | INTELLIGENCE | 4 |
| 0 – 90 DAYS | INTELLIGENCE | 9 |
| 90 – 180 DAYS | INTELLIGENCE | 8 |

TECHNOLOGY — 610

| ITEM | DIMENSION | VALUE |
|---|---|---|
| SERVER 2007 | TECHNOLOGY | 7 |
| WEBSITE.COM | TECHNOLOGY | 9 |
| VENDOR.NET | TECHNOLOGY | 7 |

PERIMETER — 615

| ITEM | DIMENSION | VALUE |
|---|---|---|
| 2087/tcp | PERIMETER | 5 |
| 22/tcp | PERIMETER | 9 |
| 3306/tcp | PERIMETER | 9 |

SECURITY CONTROLS — 620

| ITEM | DIMENSION | VALUE |
|---|---|---|
| SECURITY FIRMWARE | CONTROLS | 5 |
| EMAIL POLICY | CONTROLS | 4 |

ATTACK SURFACE — 625

| ITEM | DISCOVERED INSTANCES |
|---|---|
| 22/tcp | 3 |
| IIS 6.0 | 1 |
| INTELLIGENCE HIT: CVE Nnnnn | 2 |

RISK SCORE:

| LOW 0.0 – 3.9 | ELEVATED 4.0 – 6.9 | HIGH 7.0 – 10.0 | EMERGENCY > 10 |
|---|---|---|---|

FIG. 6

SECURITY MODEL UTILIZING MULTI-CHANNEL DATA

CROSS-REFERENCE TO RELATED PATENT APPLICATIONS

This application claims priority to U.S. Provisional Application No. 63/007,045, filed Apr. 8, 2020, incorporated herein by reference in its entirety.

TECHNICAL FIELD

The present disclosure relates generally to computer architecture and software for information security and cybersecurity. Cybersecurity systems and methods utilizing multi-channel data are described. A computer-based information security model utilizing multi-channel fusion is also described, as are the related system architecture and software.

BACKGROUND

In a computer networked environment such as the Internet, users and entities such as people or companies maintain data in computer systems connected to networks. The data, systems, and networks are prone to various security vulnerabilities, misconfigurations, and partial implementations, which may lead to cybersecurity vulnerabilities, which, in turn, may lead to cybersecurity attacks. Early and preemptive detection can prevent or minimize the impact of cybersecurity attacks. However, existing cybersecurity monitoring architectures and software limit insights into security vulnerabilities to a particular data plane, such as network, infrastructure, and/or application-related data, and to particular types of security events associated with the particular data plane. Further, such architectures and software require that lists of related computer assets be separately catalogued and maintained. Consequently, new vulnerabilities associated with changes in infrastructure or software ecosystems may be missed if the associated asset has not been timely identified by a security assurance framework.

SUMMARY

Some arrangements relate to a computer system. The system includes a plurality of data channels configured to access entity data. The system also includes a data channel communication network configured to communicate the entity data from the plurality of data channels. The system also includes a plurality of data sources configured to store the entity data. The plurality of data sources include a data source associated with a data channel of the plurality of data channels. The system also includes a processing circuit communicatively coupled to the data channel via the data channel communication network. The processing circuit is configured to receive, via the data channel, the entity data including device connectivity data. The processing circuit is also configured to parse a first property and a second property from the device connectivity data. The processing circuit is also configured to identify a first vulnerability associated with the first property and the second vulnerability associated with a second property. The processing circuit is also configured to determine a first impact of the first vulnerability and a second impact of the second vulnerability. The processing circuit is also configured to assign the first property to a first cybersecurity dimension and the second property to a second cybersecurity dimension. The processing circuit is also configured to generate a first cybersecurity risk score based at least on the first impact of the first vulnerability. The first cybersecurity risk score relates to the first cybersecurity dimension. The processing circuit is also configured to generate a second cybersecurity risk score based at least on the second impact of the second vulnerability. The second cybersecurity risk score relates to the second cybersecurity dimension. The processing circuit is also configured to generate a multi-dimensional score for a target computer network environment based on aggregating the first cybersecurity risk score and the second cybersecurity risk score.

In some arrangements, the processing circuit is also configured to parse from the device connectivity data at least one of a device property, a network property, and network information. In some arrangements, the processing circuit is also configured to analyze Internet protocol (IP) traffic associated with the target computer network environment. In some arrangements, the processing circuit is also configured to update the entity data based on receiving additional data via at least some of the plurality of data channels, analyze the updated entity data to identify new device connectivity data, generate an updated cybersecurity risk score based on the new device connectivity data, and generate an updated multi-dimensional score based on the updated cybersecurity risk score. In some arrangements, generating the updated cybersecurity risk score occurs at least in part contemporaneously with updating the entity data. In some arrangements, generating the updated cybersecurity risk score is based on a change in one or more property of the device connectivity data, the change corresponding to a predetermined period of time. In some arrangements, detecting the first vulnerability is based on a security parameter. In some arrangements, the first impact of the first vulnerability is based on at least one of a number of occurrences associated with the first vulnerability and a line-of-business of an entity.

In some arrangements, the processing circuit is also configured to receive, via a computing device of a partner institution of an entity, a customization parameter. In some arrangements, the processing circuit is also configured to generate a user-interactive cybersecurity dashboard based on the entity data and the customization parameter, wherein the user-interactive cybersecurity dashboard includes a graphical user interface. In some arrangements, the processing circuit is also configured to provide to the computing device of the partner institution the user-interactive cybersecurity dashboard, wherein the user-interactive cybersecurity dashboard is presented on a display of the computing device and includes a selectable drill-down option. In some arrangements, the processing circuit is also configured to receive, via the user-interactive cybersecurity dashboard, a selection of the selectable drill-down option. In some arrangements, the processing circuit is also configured to, in response to receiving the selection, update the user-interactive cybersecurity dashboard based on the entity data and the selection. In some arrangements, providing the user-interactive cybersecurity dashboard includes indicating a remediation item for the entity to remediate, and the remediation item corresponds to a detected vulnerability. In some arrangements, the processing circuit is also configured to track progress of the remediation item based at least on periodically scanning the plurality of data channels. In some arrangements, the processing circuit is also configured to generate a long-term trend summary associated with the entity and based on detected vulnerabilities and progress of the remediation item. In some arrangements, the long-term trend summary is added to the user-interactive cybersecurity dashboard.

In some arrangements, the first cybersecurity dimension is at least one of a technology security dimension, a perimeter security dimension, an intelligence security dimension, and a security controls dimension.

In some arrangements, the processing circuit is also configured to calculate a roll-up score. In some arrangements, the processing circuit is also configured to adjust the roll-up score based on determining a mitigating security score. The mitigating security score is based on at least one identified mitigation technique to reduce vulnerabilities. The identified mitigation technique is identified by analyzing the entity data.

Some arrangements relate to a method of analyzing multi-channel data based on a security model in a computer network environment. In some arrangements, the method includes receiving, by a processing circuit, entity data comprising device connectivity data. In some arrangements, the method includes analyzing, by the processing circuit, the device connectivity data. In some arrangements, the method includes assigning a property of the device connectivity data to a specific cybersecurity dimension of a plurality of cybersecurity dimensions based on correlating the property to a vulnerability. In some arrangements, the method includes generating, by the processing circuit, a first cybersecurity risk score based at least on the vulnerability. The first cybersecurity risk score is associated with a first cybersecurity dimension. In some arrangements, the method includes generating, by the processing circuit, a multi-dimensional score based on aggregating the first cybersecurity risk score with a second cybersecurity risk score associated with a second cybersecurity dimension.

In some arrangements, the method includes parsing from the device connectivity data at least one of a device property, network property, and network information. In some arrangements, the method includes analyzing IP traffic associated with at least one of a domain and a subdomain of a target computer network environment. In some arrangements, the method includes updating the entity data based on receiving additional data. In some arrangements, the method includes analyzing the updated entity data to identify new device connectivity data. In some arrangements, the method includes generating an updated cybersecurity risk score based on the new device connectivity data. In some arrangements, the method includes generating an updated multi-dimensional score based on the updated cybersecurity risk score.

In some arrangements, the method includes receiving, via a computing device of a partner institution of an entity, a customization parameter. In some arrangements, the method includes generating a user-interactive cybersecurity dashboard based on the entity data and the customization parameter, wherein the user-interactive cybersecurity dashboard includes a graphical user interface. In some arrangements, the method includes providing to the computing device of the partner institution the user-interactive cybersecurity dashboard, wherein the user-interactive cybersecurity dashboard is presented on a display of the computing device and includes a selectable drill-down option. In some arrangements, the method includes receiving, via the user-interactive cybersecurity dashboard, a selection of the selectable drill-down option. In some arrangements, the method includes, in response to receiving the selection, updating the user-interactive cybersecurity dashboard based on the entity data and the selection.

In some arrangements, the method includes determining a remediation item. In some arrangements, the method includes tracking progress of the remediation item based at least on periodically scanning a plurality of data channels. In some arrangements, the method includes generating a long-term trend summary associated with the entity and based on detected vulnerabilities and progress of the remediation item, wherein the long-term trend summary is added to the user-interactive cybersecurity dashboard.

Some arrangements relate to a computer-readable storage medium (CRM) having instructions stored thereon that, when executed by at least one processing circuit, cause the at least one processing circuit to perform operations. The operations include receiving, by the at least one processing circuit, entity data that includes device connectivity data. In some arrangements, the operations include analyzing, by the at least one processing circuit, the device connectivity data, including assigning a property of the device connectivity data to a specific cybersecurity dimension of a plurality of cybersecurity dimensions based on correlating the property to a vulnerability. In some arrangements, the operations include generating, by the at least one processing circuit, a first cybersecurity risk score based at least on the vulnerability, wherein the first cybersecurity risk score is associated with a first cybersecurity dimension. In some arrangements, the operations include generating, by the processing circuit, a multi-dimensional score based on aggregating the first cybersecurity risk score with a second cybersecurity risk score associated with a second cybersecurity dimension.

BRIEF DESCRIPTION OF THE DRAWINGS

FIG. 6 is an example illustration of a plurality of scoring tables and a visibility table, according to some arrangements;

Figure 1:
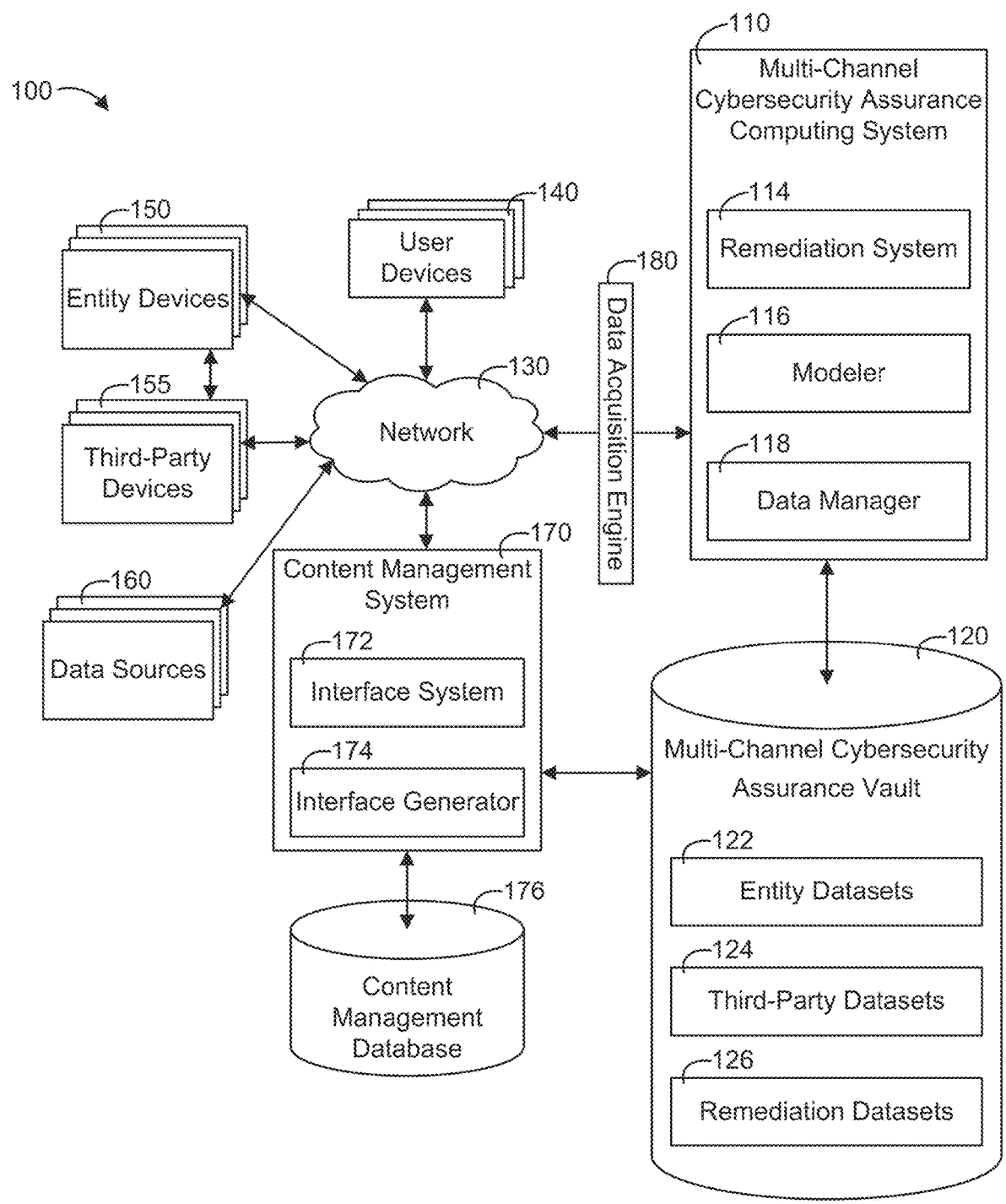
FIG. 1 is a block diagram depicting an example of a multi-channel cybersecurity assurance computing system and computing environment, according to some arrangements.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Referring generally to the Figures, the systems and methods described herein relate generally to fusing multi-channel data based on a security model in a computer network environment. As used herein, the terms "fusing" or "fusion" (e.g., as in "data fusion", "pipeline fusion", "channel fusion") refer to computer-based systems and methods for programmatically enriching data by integrating data streams, data pipelines, data sets, etc. that are related to multi-channel cybersecurity assurance. In some arrangements, the multi-channel data fusion operations are based at least in part on a causal security model that can include entity data associated with an entity. The security data, which may include device connectivity data, software metadata, IP traffic data, etc., can be received from a plurality of data channels and can pertain to a plurality of computing devices. In general, entity data can be analyzed to detect cybersecurity vulnerabilities and/or threats such that cybersecurity risk scores can be generated and aggregated to generate a multi-dimensional score.

As used herein, a "cyber-incident" may be any incident where a party (e.g., user, individual, institution, company) gains unauthorized access to perform unauthorized actions in a computer network environment. A cyber-incident may result from a cybersecurity vulnerability. In many systems, cybersecurity vulnerabilities (e.g., malware, unpatched security vulnerabilities, expired certificates, hidden backdoor programs, super-user and/or admin account privileges, remote access policies, other policies and procedures, type and/or lack of encryption, type and/or lack of network segmentation, common injection and parameter manipulation, automated running of scripts, unknown security bugs in software or programming interfaces, social engineering, and IoT devices) can go undetected and unaddressed, leading to hacking activities, data breaches, cyberattacks (e.g., phishing attacks, malware attacks, web attacks, and artificial intelligence (AI)-powered attacks), and other detrimental cyber-incidents.

Accordingly, the ability to avoid and prevent cyber threats, such as hacking activities, data breaches, and cyberattacks, provides entities and users (e.g., provider, institution, individual, and company) improved cybersecurity by fusing multi-channel data associated with entities and users. In particular, fusing multi-channel data can improve the protection of customer data (e.g., sensitive data such as medical records and financial information), protection of products (e.g., proprietary business data such as plans, code and other intellectual property, and strategies), protection of reputation (e.g., customer confidence and market praise), and reduction of financial cost (e.g., falling stock price as result of a data breach, investigation and forensic efforts as a result of a cyberattacks, and legal fees incurred as a result of hacking activities). The causal design and execution of cybersecurity models for detecting and addressing cybersecurity vulnerabilities helps dynamically monitor and discover relationships (e.g., network relationships, hardware relationships, device relationships and financial relationships) between entities and users. The causal approach to multi-channel data and/or pipeline fusion allows cybersecurity models to provide significant improvements to cybersecurity of entities and users by improving network security, infrastructure security, technology security, and data security.

Further, quantifying cybersecurity for entities and users, identifying specific vulnerabilities and mapping them to specific assets provides the technical benefit of generating automatic remediation recommendations and avoiding and preventing successful hacking activities, successful cyberattacks, data breaches, and other detrimental cyber-incidents. As described herein, the systems and methods of the present disclosure may include generating and exposing to the affected systems access-controlled remediation-related executables. An additional benefit from quantifying cybersecurity risks is automated or automatically-assisted triage of weaknesses, which optimizes the usage of limited resources to achieve rapid technology risk reduction over a given timeframe.

Further, the present disclosure presents a technical improvement of dynamic infrastructure discovery. For example, assets associated with a particular infrastructure can be automatically discovered in the process of fusing multi-channel security data without the need to maintain separate catalogues of network assets, infrastructure assets, operating systems, etc. for a target entity. In some embodiments, the data and/or pipeline fusion operations include scanning for vulnerabilities associated with a particular entity or device identifier, such as a domain identifier (e.g., a top-level domain (TLD) identifier, a subdomain identifier, or a URL string pointing to a particular directory), an IP address, a subnet, etc. Consequently, instead of separately scanning each subclass of assets, a computing system can utilize a fused communication pipeline view into a computing environment of a particular target entity (e.g., via the data acquisition engine 180 of FIG. 1) and centrally manage discovery of different types of assets and associated vulnerabilities—for example, by causing a scan of the relevant components to be initiated in a single operation. The scanning operations, described further herein, may comprise computer-executed operations to identify device connectivity data and/or IP traffic data associated with an entity, determine vulnerabilities based on parsing the device connectivity data and/or IP traffic data and linking the parsed items to various sources of known breach data (e.g., via the data fusion process), and generating a user-interactive multidimensional reporting and scoring interface with links to remediation items and related computer executables.

Referring now to FIG. 1, a block diagram depicting an example of a multi-channel cybersecurity assurance system 110 and a computing environment 100 is shown, according to some arrangements. As shown, the environment 100 comprises the multi-channel cybersecurity assurance system 110, which includes a multi-channel cybersecurity assurance vault 120. The multi-channel cybersecurity assurance system 110 is communicatively coupled, via the data acquisition engine 180, to a plurality of devices 140, 150 and 155, data sources 160 and the content management system 170. The devices 140, 150 and 155 and/or the data sources 160 may initiate and/or route (e.g., provide) device connectivity data, IP traffic data and other types of data, such as additional intelligence data that can be fused by the multi-channel cybersecurity assurance system 110. The content management system 170 can be used to deliver the data fusion outputs (e.g., in the form of various security scores and/or remediation executables) generated by the multi-channel cybersecurity assurance system 110. The data sources 160 may provide data via various separate communication pipelines (e.g., network channels, data communication channels), which may be consolidated (fused) by the data acquisition engine 180 to simplify the management of scanning executables by the multi-channel cybersecurity assurance system 110. For example, the data acquisition engine 180 may provide a single API to access various data generated or routed by devices 140, 150 and 155 and/or by the data sources 160. As described further herein, the devices 140, 150 and 155 may provide device connectivity data, IP traffic data and other system-related data, whereas the data sources 160 are additional data sources that may provide additional intelligence data.

Referring to FIG. 1, the multi-channel cybersecurity assurance system 110 is shown to include a remediation system 114, a modeler 116, and a data manager 118. The computing environment 100 is shown to include a multi-channel cybersecurity assurance vault 120, entity datasets 122, third-party datasets 124, remediation datasets 126, a network 130, one or more user devices 140, one or more entity devices 150, one or more third-party devices 155, one or more data sources 160, a content management system 170, an interface system 172, an interface generator 174, and a content management database 176. These computing systems can include at least one processor (e.g., a physical processor and/or a virtualized processor) and at least one memory (e.g., a memory device and/or virtualized memory).

In general, one or more processing circuits included in the various systems described herein can include a microprocessor, an application specific integrated circuit (ASIC), a field-programmable gate array (FPGA), or combinations thereof. A memory can include electronic, optical, magnetic, or any other storage or transmission device capable of providing the processor with program instructions stored in the memory. Instructions can include executable code from any suitable computer programming language. The memory may store machine instructions that, when executed by the processing circuit, cause the processing circuit to perform one or more of the operations described herein. The memory may also store parameter data to affect presentation of one or more resources, animated content items, etc. on the computing device. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which a processor can read instructions. The instructions may include code from any suitable computer programming language such as ActionScript®, C, C++, C#, Java®, JavaScript®, JSON, Perl®, HTML, HTML5, XML, Python®, and Visual Basic®.

The operations described in this disclosure can be implemented as operations performed by a data processing apparatus on data stored on one or more computer-readable storage devices or received from other sources. The terms "data processing system" or "processor" encompass all kinds of apparatus, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross platform runtime environment, a virtual machine, or a combination of one or more of them. The apparatus and execution environment can include various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuit, component, subroutine, object, or other unit suitable for use in a computing environment. A computer program may, but need not, correspond to a file in a file system. A computer program can be stored in a portion of a file that holds other programs or data (e.g., one or more scripts stored in a markup language document), in a single file dedicated to the program in question, or in multiple coordinated files (e.g., files that store one or more subsystems, sub-programs, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform actions by operating on input data and generating output.

In some arrangements, one or more processing circuits can be configured to load instructions from the main memory (or from data storage) into cache memory. Furthermore, the one or more processing circuits can be configured to load instructions from cache memory into onboard registers and execute instructions from the onboard registers. In some implementations, instructions are encoded in and read from a read-only memory (ROM) or from a firmware memory chip (e.g., storing instructions for a Basic I/O System (BIOS)).

The one or more processing circuits can be connected to the cache memory. However, in some implementations, the cache memory can be integrated into the one or more processing circuits and/or implemented on the same circuit or chip as the one or more processing circuits. Some implementations include multiple layers or levels of cache memory, each further removed from the one or more processing circuits. Some implementations include multiple processing circuits and/or coprocessors that augment the one or more processing circuits with support for additional specialized instructions (e.g., a math coprocessor, a floating point coprocessor, and/or a graphics coprocessor). The coprocessor can be closely connected to the one or more processing circuits. However, in some arrangements, the coprocessor is integrated into the one or more processing circuits or implemented on the same circuit or chip as the one or more processing circuits. In some implementations, the coprocessor is further removed from the one or more processing circuits, e.g., connected to a bus. Details regarding processing circuits, memory, and instructions are further explained in detail with reference to FIG. 11.

The computing system can include clients and servers. A client and server are generally remote from each other and typically interact through a communication network. The relationship of client and server arises by virtue of computer programs running on the respective computers and having a client-server relationship to each other. In some arrangements, a server transmits data (e.g., an HTML page) to a client device (e.g., for purposes of displaying data to and receiving user input from a user interacting with the client device). Data generated at the client device (e.g., a result of the user interaction) can be received from the client device at the server.

To provide for interaction with a user, arrangements of the subject matter described in this specification can be carried out using a computer having a display device, e.g., a quantum dot display (QLED), organic light-emitting diode (OLED), or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, tactile input, or other biometric information. In addition, a computer can interact with a user by electronically transmitting documents to and receiving documents from a device that is used by the user; for example, by electronically transmitting web pages to a web browser on a user's client device in response to requests received from the web browser.

Further referring to the components of FIG. 1, one or more entity devices 150 may be used by an entity to perform various actions and/or access various types of data, some of which may be provided over a network 130 (e.g., the Internet, LAN, WAN). An "entity" as used herein may refer to an individual operating one or more entity devices 150 and interacting with resources or data via the entity devices 150. The entity devices 150 may be used to electronically transmit data (e.g., entity data) to the user devices 140, multi-channel cybersecurity assurance system 110, and/or content management system 170. The entity devices 150 can also be used to access websites (e.g., using an Internet browser), cybersecurity risk scores, and user-interactive graphical interfaces (e.g., security dashboard), and/or to receive any other type of data. In one example, an entity associated with an entity device 150 can perform and execute instructions on the content management system 170, multi-channel cybersecurity assurance system 110, and/or multi-channel cybersecurity assurance vault 120. In various arrangements, the entity can use the systems and methods of the present disclosure to monitor computing devices that the entity utilizes, and/or to monitor computing devices of third parties.

One or more third-party devices 155 may be used by a third-party with a relationship to an entity (e.g., provider, vendor, supplier, business partner, a monitored network entity and so on) to perform various actions and/or access various types of data, some of which may be provided over network 130. A "third party" as used herein may refer to an individual operating one or more third-party devices 155, interacting with resources or data via the third-party devices 155. In some arrangements, the third parties can include an organization's partner institutions and/or vendors. The third-party devices 155 may be used to electronically transmit data (e.g., entity data) to the user devices 140, multi-channel cybersecurity assurance system 110, and/or content management system 170, to access websites (e.g., using a browser), supply services, supply products, and to receive and/or transmit any other types of data. For example, a third party can be a statement printing vendor of a financial institution. In another example, a third party could be a credit scoring data vendor of a financial institution. In another example, a third party can be a technology vendor of a financial institution.

One or more user devices 140 (e.g., smartphones, tablets, computers, or smartwatches) may be used by a user to perform various actions and/or access various types of data, some of which may be provided over the network 130. A "user" as used herein may refer to an individual operating one or more user devices 140 and interacting with resources or data via the user devices 140. The user devices 140 may be used to electronically transmit data (e.g., entity data) to other user devices 140, multi-channel cybersecurity assurance system 110, and/or content management system 170. The user devices 140 may also be used to access websites (e.g., using a browser), cybersecurity risk scores, and user-interactive graphical interfaces (e.g., security dashboard), and used to receive any other types of data. In some arrangements, the entity devices 150 and/or user devices 140 have enabled location services which can be tracked over network 130. Location services may use a global positioning system (GPS) or other technologies to determine a location of the entity devices 150 and/or user devices 140. In some arrangements, location information can be used to populate or determine location-related properties of the device connectivity data used by the multi-channel cybersecurity assurance system 110.

In various arrangements, internal users of the multi-channel cybersecurity assurance system 110 may have various levels of access to perform operations and review information (e.g., configure dashboards, determine remediation recommendations, analyze cybersecurity performance). In some arrangements, external users of the multi-channel cybersecurity assurance system 110 may have various levels of access to perform operations and review information (e.g., restricted access, access and review dashboards, review remediation recommendation, review cybersecurity vendor performance). Using a username and credentials, a user (e.g., internal or external) may gain access to perform various operations and review various information. Permissions associated with a user can be used to determine the data that a user has access to. That is, permissions can be used to define the access level for each user. For example, a certain dashboard can be generated that is only accessible to the internal users that have permissions to access the certain dashboard. In some arrangements, permissions can be user-specific and/or each user can have separate and distinct accounts.

Further with respect to the components of FIG. 1, the network 130 may include a local area network (LAN), a wide area network (WAN), a telephone network, such as the Public Switched Telephone Network (PSTN), a wireless link, an intranet, the Internet, or combinations thereof. The multi-channel cybersecurity assurance system 110 and computing environment 100 can also include at least one data processing system or processing circuit, such as entity devices 150 and/or multi-channel cybersecurity assurance system 110. The multi-channel cybersecurity assurance system 110 can communicate via the network 130, for example with multi-channel cybersecurity assurance vault 120, user devices 140, entity devices 150, third-party devices 155, data sources 160, content management system 170, and/or data acquisition engine 180.

The network 130 can enable communication between various nodes, such as the multi-channel security assurance computing system 110 and entity devices 150. In some arrangements, data flows through the network 130 from a source node to a destination node as a flow of data packets, e.g., in the form of data packets in accordance with the Open Systems Interconnection (OSI) layers. A flow of packets may use, for example, an OSI layer-4 transport protocol such as the User Datagram Protocol (UDP), the Transmission Control Protocol (TCP), or the Stream Control Transmission Protocol (SCTP), transmitted via the network 130 layered over an OSI layer-3 network protocol such as Internet Protocol (IP), e.g., IPv4 or IPv6. The network 130 is composed of various network devices (nodes) communicatively linked to form one or more data communication paths between participating devices. Each networked device includes at least one network interface for receiving and/or transmitting data, typically as one or more data packets. An illustrative network 130 is the Internet; however, other networks may be used. The network 130 may be an autonomous system (AS), i.e., a network that is operated under a consistent unified routing policy (or at least appears to from outside the AS network) and is generally managed by a single administrative entity (e.g., a system operator, administrator, or administrative group).

The network 130 may be composed of multiple connected sub-networks or AS networks, which may meet at one or more of: an intervening network (a transit network), a dual-homed gateway node, a point of presence (POP), an Internet eXchange Point (IXP), and/or additional other network boundaries. The network 130 can be a local-area network (LAN) such as a company intranet, a metropolitan area network (MAN), a wide area network (WAN), an inter-network such as the Internet, or a peer-to-peer network, e.g., an ad hoc Wi-Fi peer-to-peer network. The data links between nodes in the network 130 may be any combination of physical links (e.g., fiber optic, mesh, coaxial, twisted-pair such as Cat-5 or Cat-6, etc.) and/or wireless links (e.g., radio, satellite, microwave, etc.).

The network 130 can include carrier networks for mobile communication devices, e.g., networks implementing wireless communication protocols such as the Global System for Mobile Communications (GSM), Code Division Multiple Access (CDMA), Time Division Synchronous Code Division Multiple Access (TD-SCDMA), Long-Term Evolution (LTE), or any other such protocol including so-called generation 3G, 4G, 5G, and 6G protocols. The network 130 can include short-range wireless links, e.g., via Wi-Fi, BLUETOOTH, BLE, or ZIGBEE, sometimes referred to as a personal area network (PAN) or mesh network. The network 130 may be public, private, or a combination of public and private networks. The network 130 may be any type and/or form of data network and/or communication network.

The network 130 can include a network interface controller that can manage data exchanges with devices in the network 130 (e.g., the user devices 140) via a network interface (sometimes referred to as a network interface port). The network interface controller handles the physical and data link layers of the Open Systems Interconnection (OSI) model for network communication. In some arrangements, some of the network interface controller's tasks are handled by one or more processing circuits. In various arrangements, the network interface controller is incorporated into the one or more processing circuits, e.g., as circuitry on the same chip.

In some arrangements, the network interface controller supports wireless network connections and an interface is a wireless (e.g., radio) receiver/transmitter (e.g., for any of the IEEE 802.11 Wi-Fi protocols, near field communication (NFC), BLUETOOTH, BLUETOOTH LOW ENERGY (BLE), ZIGBEE, ANT, or any other wireless protocol). In various arrangements, the network interface controller implements one or more network protocols such as Ethernet. Generally, the multi-channel cybersecurity assurance system 110 can be configured to exchange data with other computing devices via physical or wireless links through a network interface. The network interface may link directly to another device or to another device via an intermediary device, e.g., a network device such as a hub, a bridge, a switch, or a router, connecting the multi-channel cybersecurity assurance system 110 to the network 130.

Expanding generally on network traffic and packets, the various computing devices described herein (e.g., 140, 150, 155, 160, 170) can originate and/or transmit traffic to the computing environment 100 and multi-channel cybersecurity assurance system 110, via the network 130. The term "traffic" generally refers to data communications between the computing devices and one or more components of the computing environment 100 shown in FIG. 1. For example, a user device (e.g., user devices 140) may submit requests to access various resources (e.g., applications, webpages, services, operating system management-related executables, file system management-related executables, system configuration-related executables) on a host within the computing environment 100 of FIG. 1. In another example, a user device can generate and/or transmit device connectivity data. Further, in an example arrangement described herein, a first device is a user device and a second device is a production host, such as an application server, a mail server, etc. The flow of traffic via the network 130 is multi-directional such that the first device may receive return traffic originated by the second device. The return traffic to the first device via the network 130 may include data responsive to user requests to access the resources on the respective computing system (e.g., on the second device).

Network traffic can be segmented into packets. Each packet is a formatted unit for the data and routing instructions carried via the network 130. As used herein, the term "packet" may refer to formatted units at various levels of the OSI networking and/or TCP/IP models, such that the terms "packet", "IP packet", "segment", "datagram", and "frame" may be used interchangeably. As used herein, the term "packet" can be used to denote monitored network traffic generated by a particular device associated with a monitored entity. However, one of skill will appreciate that information received and transmitted by the computing environment 100 and also be encoded in packets, such as TCP/IP packets.

An example packet includes a header, a footer, and a payload. In some arrangements, packets may also include metadata, which may include further routing information. For example, in some arrangements, packets may be routed via a software-defined networking switch, which may include in the packet further information (metadata) containing routing information for the software-defined networking environment. For example, in addition to a payload, application-layer and/or link-layer in an example packet, may contain a header and/or footer that may include a source address of the sending host (e.g., a user device), destination address of the target host, a source port, a destination port, a checksum or other error detection and correction information, packet priority, traffic class, and/or type of service (ToS), packet length, etc. In arrangements where the network 130 comprises one or more virtual local area networks (VLANs), such that, for example, the various computing devices are on different VLANs, the packet may also contain a VLAN identifier.

Any of the foregoing items in the packet can describe, at least in part, activity in a networked environment. In some arrangements, at least some of the foregoing items may be included in device connectivity data received via a search or discovery engine for Internet-connected devices, as described further herein. For example, an IP packet can include a host address (e.g., IP address) and/or a port number. Device connectivity data provided by a search or discovery engine for Internet-connected devices, can likewise include a property populated with an IP address assigned to a particular device and a port number assigned to a particular software application running on the device in addition to including further information.

Accordingly, any suitable packet and/or device connectivity data may be used by the multi-channel cybersecurity assurance system 110 to identify vulnerabilities in the associated systems (e.g., at the source system identified by the packet, at the destination system identified by the packet). For example, a header, a footer, and/or metadata of a packet may include routing information for the packet. As used herein, "routing information" is defined as source and/or destination information. For instance, in some arrangements, packet includes application-layer level routing information, such as HTTP routing information, TLS routing information, SSL routing information, SMTP routing information, etc. In some arrangements, packet includes transport and/or Internet-link level routing information, such as one or more routing identifiers specific to the TCP, UDP, SCTP, ICPMv4, ICMPv6 protocols, etc. In some arrangements, packet includes data link-layer routing information, such as a source MAC address, destination MAC address, VLAN ID, VLAN priority, etc. In the arrangement of FIG. 1, each packet also contains a payload (e.g., data carried on behalf of an application) encapsulated with routing information. As described further herein, various vulnerabilities may be associated with these various segments of data from particular packets.

Further with respect to the components of FIG. 1, a content management system 170 may be configured to generate content for displaying to users. The content can be selected from among various resources (e.g., webpages, applications). The content management system 170 is also structured to provide content (e.g., via a graphical user interface (GUI)) to the user devices 140 and/or entity devices 150, over the network 130, for display within the resources. For example, in various arrangements, a security dashboard may be integrated in an institution's application or provided via an Internet browser. The content from which the content management system 170 selects may be provided by the multi-channel cybersecurity assurance system 110 via the network 130 to one or more entity devices 150. In some implementations, the content management system 170 may select content to be displayed on the user devices 140. In such implementations, the content management system 170 may determine content to be generated and published in one or more content interfaces of resources (e.g., webpages, applications).

The content management system 170 may include one or more systems (e.g., computer-readable instructions executable by a processor) and/or circuits (e.g., ASICs, Processor Memory combinations, logic circuits) configured to perform various functions of the content management system 170. The content management system 170 can be run or otherwise be executed on one or more processors of a computing device, such as those described below in FIG. 11. In some implementations, the systems may be or include an interface system 172 and an interface generator 174. It should be understood that various implementations may include more, fewer, or different systems relative to those illustrated in FIG. 1, and all such modifications are contemplated within the scope of the present disclosure.

The content management system 170 can also be configured to query the content management database 176 and/or multi-channel cybersecurity assurance vault 120 for information and store information in content management database 176 and/or multi-channel cybersecurity assurance vault 120. In various arrangements, the content management database 176 includes various transitory and/or non-transitory storage media. The storage media may include magnetic storage, optical storage, flash storage, and RAM. The content management database 176 and/or the content management system 170 can use various APIs to perform database functions (e.g., managing data stored in content management database 176). The APIs can include SQL, NoSQL, NewSQL, ODBC, and/or JDBC components.

In some implementations, one or more client devices, e.g., instances of user devices 140, entity devices 150, third-party devices 155, and/or data sources 160, are in communication with a particular database management system (DBMS) or data storage vault, e.g., via a direct link or via the network 130. In some implementations, one or more clients obtain data from the DBMS using queries in a formal query language such as Structured Query Language (SQL), Hyper Text Structured Query Language (HTSQL), Contextual Query Language (CQL), Data Mining Extensions (DMX), or XML Query (XQuery). In some implementations, one or more clients obtain data from the DBMS using an inter-process communication architecture such as the Common Object Request Broker Architecture (CORBA), Remote Procedure Calls (RPC), Object Linking and Embedding (OLE), Component Object Model (COM), or Distributed Component Object Model (DCOM). In some implementations, one or more clients obtain data from the DBMS using natural language or semantic queries. In some implementations, one or more clients obtain data from the DBMS using queries in a custom query language such as a Visualization API Query Language. Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, e.g., one or more modules of computer program instructions, encoded on one or more computer storage media for execution by, or to control the operation of, a data processing apparatus (including, e.g., a processor 1110). A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium is tangible. The computer storage medium stores data, e.g., computer executable instructions, in a non-transitory form.

Further with respect to FIG. 1, the interface system 172 can be configured to provide one or more customized dashboards (e.g., stored in content management database 176) to one or more computing devices (e.g., user devices 140, entity devices 150, third-party devices 155, and/or multi-channel cybersecurity assurance system 110) for presentation. That is, the provided customized dashboards can execute and/or be displayed at the computing devices described herein. In some arrangements, the customized dashboards can be provided within a web browser. In some arrangements, the customized dashboards can comprise PDF files. In some arrangements, the customized dashboards can be provided via email. According to various arrangements, the customized dashboards can be provided on-demand or as part of push notifications. In various arrangements, the interface system 172 executes operations to provide the customized dashboards to the user devices 140, entity devices 150, third-party devices 155, and/or multi-channel cybersecurity assurance system 110 without utilizing the web browser. In various arrangements, the interface system 172 the customized dashboard can be provided within an application (e.g., mobile application, desktop application). The dashboard from which the content management system 170 generates (e.g., the interface generator 174) may be provided to one or more entities, via the network 130, to one or more entity devices 150. In some arrangements, the content management system 170 may select dashboards and/or security reports associated with the entity to be displayed on the user devices 140.

In an example arrangement, an application executed by the user devices 140, entity devices 150, third-party devices 155, and/or multi-channel cybersecurity assurance system 110 can cause the web browser to display on a monitor or screen of the computing devices. For example, the entity may connect (e.g., via the network 130) to a website structured to host the customized dashboards. In various arrangements, hosting the customized dashboard can include infrastructure such as host devices (e.g., computing device) and a collection of files defining the customized dashboard and stored on the host devices (e.g., in a database). The web browser operates by receiving input of a uniform resource locator (URL) into a field from an input device (e.g., a pointing device, a keyboard, a touchscreen, mobile phone, or another form of input device). In response, the interface system 172 executing the web browser may request data such as from the content management database 176. The web browser may include other functionalities, such as navigational controls (e.g., backward and forward buttons, home buttons). The interface system 172 may execute operations of the content management database 176 (or provide data from the content management database 176 to the user devices 140, entity devices 150, third-party devices 155, and/or multi-channel cybersecurity assurance system 110 for execution) to provide the customized dashboards at the user devices 140, entity devices 150, third-party devices 155, and/or multi-channel cybersecurity assurance system 110.

In some arrangements, the interface system 172 can include both a client-side application and a server-side application. For example, a client-side interface system 172 can be written in one or more general purpose programming languages (such as ActionScript®, C, C++, C#, Java®, JavaScript®, JSON, Perl®, Swift, HTML, HTML5, XML, Python®, and Visual Basic®) and can be executed by user devices 140, entity devices 150, and/or third-party devices 155. The server-side interface system 172 can be written, for example, in one or more general purpose programming languages (such as ActionScript®, C, C++, C#, Java®, JavaScript®, JSON, Perl®, Swift, HTML, HTML5, XML, Python®, and Visual Basic®), or a concurrent programming language, and can be executed by the multi-channel cybersecurity assurance system 110 and/or content management system 170.

The interface generator 174 can be configured to generate a plurality of customized dashboards and their properties, such as those described in detail below relative to example FIGS. 6-10. The interface generator 174 can generate customized user-interactive dashboards for one or more entities, such as the entity devices 150 and/or the third-party devices 155, based on data received from multi-channel cybersecurity assurance system 110, any other computing device described herein, and/or any database described herein (e.g., 120, 176). The generated dashboards can include various data (e.g., data stored in the content management database 176 and/or multi-channel cybersecurity assurance vault 120) associated with one or more entities including cybersecurity risk scores (e.g., intelligence, perimeter, technology, and/or security controls), multi-dimensional scores, remediation items, remediation actions/executables, security reports, data analytics, graphs, charts, historical data, historical trends, vulnerabilities, summaries, help information, line of business profiles, domain information, and/or subdomain information.

The content management system 170 can include at least one content management database 176. The content management database 176 can include data structures for storing information such as system definitions for customized dashboards generated via the interface generator 174, animated or other content items, and/or additional information. The content management database 176 can be part of the content management system 170, or a separate component that the content management system 170, the interface system 172, and/or the interface generator 174, can access via the network 130. The content management database 176 can also be distributed throughout the computing environment 100 and multi-channel cybersecurity assurance system 110. For example, the content management database 176 can include multiple databases associated with a specific entity (e.g., entity devices 150), a specific third-party (e.g., third-party devices 155), and/or a specific user device (e.g., user devices 140). In one arrangement, the content management system 170 includes the content management database 176.

The data sources 160 can provide data to the multi-channel cybersecurity assurance system 110. In some arrangements, the data sources 160 can be structured to collect data from other devices on network 130 (e.g., user devices 140, entity devices 150, and/or third-party devices 155) and relay the collected data to the multi-channel cybersecurity assurance system 110. In one example, an entity may have a server and database (e.g., proxy, enterprise resource planning (ERP) system) that stores network information associated with the entity. In this example, the multi-channel cybersecurity assurance system 110 may request data associated with specific data stored in the data source (e.g., data sources 160) of the entity. For example, in some arrangements, the data sources 160 can host or otherwise support a search or discovery engine for Internet-connected devices. The search or discovery engine may provide data, via the data acquisition engine 180, to the multi-channel cybersecurity assurance system 110. In some arrangements, the data sources 160 can be scanned to provide additional intelligence data. The additional intelligence data can include newsfeed data (e.g., articles, breaking news, and television content), social media data (e.g., Facebook, Twitter, Snapchat, and TikTok), geolocation data of users on the Internet (e.g., GPS, triangulation, and IP addresses), governmental databases (e.g., FBI databases, CIA databases, COVID-19 databases, No Fly List databases, terrorist databases, vulnerability database, and certificate databases), and/or any other intelligence data associated with the specific entity of interest.

The computing environment 100 can include a data acquisition engine 180. In various arrangements, the multi-channel cybersecurity assurance system 110 can be communicatively and operatively coupled to the data acquisition engine 180. The data acquisition engine 180 can include one or more processing circuits configured to execute various instructions. In various arrangements, the data acquisition engine 180 can be configured to facilitate communication (e.g., via network 130) between the multi-channel cybersecurity assurance system 110, multi-channel cybersecurity assurance vault 120 and systems described herein (e.g., user devices 140, entity devices 150, third-party devices 155, data sources 160, content management system 170). The facilitation of communication can be implemented as an application programming interface (API) (e.g., REST API, Web API, customized API), batch files, and/or queries. In various arrangements, the data acquisition engine 180 can also be configured to control access to resources of the multi-channel cybersecurity assurance system 110 and multi-channel cybersecurity assurance vault 120.

The API can be used by the data acquisition engine 180 and/or computing systems to exchange data and make function calls in a structured format. The API may be configured to specify an appropriate communication protocol using a suitable electronic data interchange (EDI) standard or technology. The EDI standard (e.g., messaging standard and/or supporting technology) may include any of a SQL data set, a protocol buffer message stream, an instantiated class implemented in a suitable object-oriented programming language (e.g., Java, Ruby, C#), an XML file, a text file, an Excel file, a web service message in a suitable web service message format (e.g., representational state transfer (REST), simple object access protocol (SOAP), web service definition language (WSDL), JavaScript object notation (JSON), XML remote procedure call (XML RPC)). As such, EDI messages may be implemented in any of the above or using another suitable technology.

In some arrangements, data is exchanged by components of the data acquisition engine 180 using web services. Where data is exchanged using an API configured to exchange web service messages, some or all components of the computing environment may include or may be associated with (e.g., as a client computing device) one or more web service node(s). The web service may be identifiable using a unique network address, such as an IP address, and/or a URL. Some or all components of the computing environment may include circuits structured to access and exchange data using one or more remote procedure call protocols, such as Java remote method invocation (RMI), Windows distributed component object model (DCOM). The web service node(s) may include a web service library comprising callable code functions. The callable code functions may be structured according to a predefined format, which may include a service name (interface name), an operation name (e.g., read, write, initialize a class), operation input parameters and data type, operation return values and data type, service message format, etc. In some arrangements, the callable code functions may include an API structured to access on-demand and/or receive a data feed from a search or discovery engine for Internet-connected devices. Further examples of callable code functions are provided further herein as embodied in various components of the data acquisition engine 180.

The data sources 160 can provide data to the multi-channel cybersecurity assurance system 110 based on the data acquisition engine 180 scanning the Internet (e.g., various data sources and/or data feeds) for data associated with a specific entity. That is, the data acquisition engine 180 can hold (e.g., in non-transitory memory, in cache memory, and/or in multi-channel cybersecurity assurance vault 120) the executables for performing the scanning activities on the data sources 160. Further, the multi-channel cybersecurity assurance system 110 can initiate the scanning operations. For example, the multi-channel cybersecurity assurance system 110 can initiate the scanning operations by retrieving domain identifiers or other entity identifiers from a computer-implemented DBMS or queue. In another example, a user can affirmatively request a particular resource (e.g., domain or another entity identifier) to be scanned, which triggers the operations. In various arrangements, the data sources 160 can facilitate the communication of data between the user devices 140, entity devices 150, and third-party devices 155, such that the data sources 160 receive data (e.g., over network 130) from the user devices 140, entity devices 150, and third-party devices 155 before sending the data other systems described herein (e.g., multi-channel cybersecurity assurance computing system and/or content management system 170). In other arrangements and as described herein, the user devices 140, entity devices 150, and third-party devices 155, and the data sources 160 can send data directly, over the network 130, to any system described herein and the data sources 160 may provide information not provided by any of the user devices 140, entity devices 150, and third-party devices 155. For example, the data sources 160 may provide supplemental intelligence information as discussed above.

As used herein, the terms "scan" and "scanning" refer to and encompass various data collection operations, which may include directly executing and/or causing to be executed any of the following operations: query(ies), search(es), web crawl(s), interface engine operations structured to enable the data acquisition engine 180 to enable an appropriate system interface to continuously or periodically receive inbound data, document search(es), dataset search(es), retrieval from internal systems of previously received data, etc. These operations can be executed on-demand and/or on a scheduled basis. In some embodiments, these operations include receiving data (e.g., device connectivity data, IP traffic data) in response to requesting the data (e.g., data "pull" operations). In some embodiments, these operations include receiving data without previously requesting the data (e.g., data "push" operations). In some embodiments, the data "push" operations are supported by the interface engine operations.

One of skill will appreciate that data received as a result of performing or causing scanning operations to be performed may include data that has various properties indicative of device properties, hardware, firmware, software, configuration information, and/or IP traffic data. For example, in an arrangement, a device connectivity data set can be received. In some embodiments, device connectivity data can include data obtained from a search or discovery engine for Internet-connected devices which can include a third-party product (e.g., Shodan), a proprietary product, or a combination thereof. Device connectivity data can include structured or unstructured data.

Various properties (e.g., records, delimited values, values that follow particular pre-determined character-based labels) can be parsed from the device connectivity data. The properties can include device-related data and/or IP traffic data. Device-related data can encompass data related to software, firmware, and/or hardware technology deployed to, included in, or coupled to a particular device. Device-related data can include IP address(es), software information, operating system information, component designation (e.g., router, web server), version information, port number(s), timestamp data, host name, etc. IP traffic data can include items included in packets, as described elsewhere herein. Further, IP traffic data included in the device connectivity data can include various supplemental information (e.g., in some arrangements, metadata associated with packets), such as host name, organization, Internet Service Provider information, country, city, communication protocol information, and Autonomous System Number (ASN) or similar identifier for a group of devices using a particular defined external routing policy. In some embodiments, device connectivity data can be determined at least in part based on banner data exposed by the respective source entity. For example, device connectivity data can comprise metadata about software running on a particular device of a source entity.

In various arrangements, scanning operations can comprise executables associated with an Internet-wide scanning tool (e.g., port scanning, network scanning, vulnerability scanning, Internet Control Message Protocol (ICMP) scanning, TCP scanning, UDP scanning) for collecting data. Further, in addition to this data, other data collected and fused with the data obtained via scanning may be newsfeed data (e.g., articles, breaking news, television), social media data (e.g., Facebook, Twitter, Snapchat, TikTok), geolocation data of users on the Internet (e.g., GPS, triangulation, IP addresses), governmental databases (e.g., FBI databases, CIA databases, COVID-19 database, No Fly List databases, terrorist databases, vulnerability database, certificate databases), and any other data associated with the specific entity of interest.

In some arrangements, scanning occurs in real-time such that the data acquisition engine 180 continuously scans the data sources 160 for data associated with the specific entity. In various arrangements, scanning may occur in periodic increments such that the data acquisition engine 180 can scan the Internet for data associated with the specific entity periodically (e.g., every minute, every hour, every day, every week, and any other increment of time.) In some embodiments, data acquisition engine 180 may receive feeds from be various data aggregating systems that collect data associated with specific entities. For example, the multi-channel cybersecurity assurance system 110 can receive specific entity data from the data sources 160, via the network 130 and data acquisition engine 180. The information collected by the data acquisition engine 180 may be stored as entity data in the entity datasets 122.

The multi-channel cybersecurity assurance system 110 may be used by institutions to assess and manage multidimensional cybersecurity schemas and information (e.g., perimeter, technology, intelligence, and security controls) relating to entities. The assessment can be accomplished using fused multi-channel data and/or pipelines as described further herein.

In various arrangements, the multi-channel cybersecurity assurance system 110, multi-channel cybersecurity assurance vault 120, and the content management system 170 can be implemented as separate systems or integrated within a single system (sometimes referred to as a "monitoring hub"). The multi-channel cybersecurity assurance system 110 can be configured to incorporate some or all of the functions/capabilities of the content management system 170 and multi-channel cybersecurity assurance vault 120, where an entity and/or third party can be subscribers to the monitoring hub.

The multi-channel cybersecurity assurance system 110 may be configured to communicate over the network 130 via a variety of architectures (e.g., client/server, peer-to-peer). The multi-channel cybersecurity assurance system 110 can be configured to generate and provide cybersecurity risk scores and multi-dimensional scores based on fusing multi-channel pipelines and/or data (e.g., scanning various data channels, receiving various data from data channels, and/or collecting various data from data channels).

The multi-channel cybersecurity assurance system 110 can be communicatively and operatively coupled to the multi-channel cybersecurity assurance vault 120, which may be configured to store a variety of information relevant to entity data and third-party data modelled by modeler 116. Information may be received from user devices 140, entity devices 150, third-party devices 155, data sources 160, and/or content management system 170. The multi-channel cybersecurity assurance system 110 can be configured to query the multi-channel cybersecurity assurance vault 120 for information and store information in the multi-channel cybersecurity assurance vault 120. In various arrangements, the multi-channel cybersecurity assurance vault 120 includes various transitory and/or non-transitory storage media. The storage media may include magnetic storage, optical storage, flash storage, and RAM. The multi-channel cybersecurity assurance vault 120 and/or the multi-channel cybersecurity assurance system 110 can use various APIs to perform database functions (i.e., managing data stored in the multi-channel cybersecurity assurance vault 120). The APIs can include, for example, SQL, NoSQL, NewSQL, ODBC, and/or JDBC.

In some arrangements, an entity (e.g., service provider, financial institution, goods provider) may submit entity data to multi-channel cybersecurity assurance system 110 and provide information about cybersecurity analyses (e.g., entity perimeter data, entity security data, entity technology security data, and/or entity security controls data), which may be stored in multi-channel cybersecurity assurance vault 120 (e.g., entity datasets 122). In addition, multi-channel cybersecurity assurance system 110 may be configured to retrieve data via the data acquisition engine 180 (e.g., perimeter data of an entity, security data of an entity, technology security data of an entity, and/or security controls data of an entity), and data may be stored in the entity datasets 122 of multi-channel cybersecurity assurance vault 120. In various arrangements, multi-channel cybersecurity assurance system 110 may be configured to retrieve third-party data via network 130 (e.g., third-party perimeter data, third-party security data, third-party technology security data, and/or third-party security controls data) which may be stored in the third-party datasets 124 of multi-channel cybersecurity assurance vault 120.

The data manager 118 can be configured to perform data fusion operations, including operations to generate and/or aggregate various data structures stored in multi-channel cybersecurity assurance vault 120, which may have been acquired as a result of scanning operations or via another EDI process. For example, the data manager 118 can be configured to aggregate entity data stored in the multi-channel cybersecurity assurance vault 120. The entity data may be a data structure associated with a specific entity and include various data from a plurality of data channels. In some embodiments, the data manager 118 can be configured to aggregate line-of-business data stored in the multi-channel cybersecurity assurance vault 120. The line-of-business data may be a data structure associated with a plurality of line-of-business of an entity and indicate various data from a plurality of data channels based on line-of-business (e.g., information technology (IT), legal, marketing and sales, operations, finance and accounting).

The data manager 118 can also be configured to receive a plurality of entity data. In some arrangements, the data manager 118 can be configured to receive data regarding the network 130 as a whole (e.g., stored in entity datasets 122)

instead of data specific to particular entity. The received data that the data manager 118 receives can be data that multi-channel cybersecurity assurance system 110 aggregates and/or data that the multi-channel cybersecurity assurance system 110 receives from the data sources 160 and/or any other system described herein.

As previously described, the multi-channel cybersecurity assurance system 110 can be configured to receive information regarding various entities on the network 130 (e.g., via device connectivity data). Further, the multi-channel cybersecurity assurance system 110 can be configured to receive and/or collect information regarding interactions that a particular entity has on the network 130 (e.g., via IP traffic data). Further, the multi-channel cybersecurity assurance system 110 can be configured to receive and/or collect additional intelligence information. Accordingly, the received or collected information may be stored as entity data in an entity datasets 122. In various arrangements, the entity datasets 122 can include entity profiles generated as described further herein.

The multi-channel cybersecurity assurance system 110 can be configured to electronically transmit information and/or notifications relating to various metrics (e.g., cybersecurity dimensions, cybersecurity risk scores, multi-dimensional scores, vulnerabilities), dashboards (e.g., graphical user interfaces) and/or models it determines, analyzes, fuses, generates, or fits to entity data and/or other data. This may allow a user of a particular one of the entity devices 150 to review the various metrics, dashboards or models which the multi-channel cybersecurity assurance system 110 determines. Further, the multi-channel cybersecurity assurance system 110 can use the various metrics to identify remediation actions for entities. The multi-channel cybersecurity assurance system 110 can cause a message to be sent to the content management system 170 and/or the entity devices 150 indicating that one or more remediation actions should be completed.

The modeler 116 implements data fusion operations of the cybersecurity assurance computing system 110. In various arrangements, the modeler 116 can be configured to receive a plurality of data (e.g., entity data) from a plurality of data sources (e.g., data manager 118, multi-channel cybersecurity assurance vault 120, user devices 140, entity devices 150, third-party devices 155, data sources 160) via one or more data channels (e.g., over network 130). Each data channel may include a network connection (e.g., wired, wireless, cloud) between the data sources and the multi-channel cybersecurity assurance system 110. For example, the modeler 116 could receive entity data from the data manager 118 based on the data manager 118 determining new entity data or identifying updated entity data. In another example, the modeler 116 could receive geolocation data from a user device (e.g., user devices 140) indicating a current location of a user associated with the entity (e.g., an employee).

In some arrangements, the modeler 116 can also be configured to collect a plurality of data from a particular data source or from a plurality of data sources based on electronically transmitting requests to the data sources via the plurality of data channels, managed and routed to a particular data channel by the data acquisition engine 180. A request submitted via the data acquisition engine 180 may include a request for scanning publicly available information exposed by the target entity (e.g., banner information). In some embodiments, the request submitted via the data acquisition engine 180 may include information regarding access-controlled data being requested from the entity. In such cases, the request can include trust verification information sufficient to be authenticated by the target entity (e.g., multi-factor authentication (MFA) information, account login information, request identification number, a pin, certificate information, a private key of a public/private key pair). This information should be sufficient to allow the target entity to verify that a request is valid.

The information regarding data requested via the data acquisition engine 180 may be any type of entity data described herein. The request may also include a deadline by which the requested data should be provided (e.g., in a response). For example, a request could be sent to an entity device (e.g., entity devices 150) for a list of utilized software utilized in a particular timeframe (e.g., currently, in the past day, in the past week, etc.) and indicating that the list should be provided within the next seven days or according to another suitable timeline. In some arrangements, a request can be linked to a response with the requested data (e.g., network information, domain information, subdomain information, infrastructure, software) to enable linking of a particular request to a particular response. In some arrangements (e.g., where requests comprise remediation recommendations that may comprise internal infrastructure components), the modeler 116 is structured to receive an access-controlled response from the target entity via the data acquisition engine 180. The access-controlled response may include information sufficient to be authenticated by an internal computer system. For example, in an arrangement, a remediation request may relate to a particular software-related vulnerability identified on a target system. The remediation request may comprise a link (e.g., a URL) to an internally-hosted update/patch verification tool, which the operator of the target entity may point at the instance of software installed on the operator's server to verify that remediation (e.g., installation of a recommended patch/security update) was successful. The link to the update/patch verification tool may be access-controlled and the response may comprise instructions to execute the tool and authentication information therefor.

In various arrangements, the modeler 116 can be configured to initiate a scan, via the data acquisition engine 180, for a plurality of data from a plurality of data sources based on analyzing device connectivity data, network properties (e.g., status, nodes, element-level (sub-document level), group-level, network-level, size, density, connectedness, clustering, attributes) and/or network information (e.g., IP traffic, domain traffic, sub-domain traffic, connected devices, software, infrastructure, bandwidth) of a target computer network environment and/or environments of the entity or associated with the entity. The operations to fuse various properties of data returned via the scan can include a number of different actions, which can parsing device connectivity data, packet segmentation, predictive analytics, cross-referencing to data regarding known vulnerabilities, and/or searching data regarding application security history. These operations can be performed to identify hosts, ports, and services in a target computer network environment. The target computer network environment can be identified by a unique identifier, such as a domain identifier (e.g., a top-level domain (TLD) identifier, a subdomain identifier, a URL string pointing to a particular directory), an IP address, a subnet, etc. Further, the target computer network environment can be defined with more granularity to encompass a particular component (e.g., an entity identified by an IP address, software/applications/operating systems/exposed API functions associated with a particular port number, IP address, subnet, domain identifier). In some arrangements, one or more particular target computer network environments can be linked to an entity profile (e.g., in the entity datasets 122). In one example, scanning can include parsing out packet and/or device connectivity data properties that may indicate available UDP and TCP network services running on the target computer network environment. In another example, scanning can include parsing out packet and/or device connectivity data that indicates the operating systems (OS) in use on the target computer network environment. In yet another example, scanning and data fusion operations can include retrieving content from a news source that indicates a particular security vulnerabilities in a particular component (e.g., software, port number, operating system) identified from the parsed packet data. These various data items can be relationally mapped to one another using any suitable property designated as a mapping key, using a combination of properties, or using a segment of a property. Some examples or mapping keys may include IP addresses, software, application, port number, protocol name and/or protocol version, entity or company name, company location, device location, etc. However, one of skill will appreciate that other suitable properties derived from device connectivity data, IP packet data, and/or intelligence data can be used as mapping keys.

The modeler 116 may be also configured to execute cybersecurity analyses as part of the data fusion operations. The outputs of these operations can include one or more cybersecurity risk scores and/or multi-dimensional scores based on the received, collected, and/or scanned and fused data. A multi-dimensional score (sometimes referred to herein as "composite score") can be indicative of overall cybersecurity threat level. That is, the multi-dimensional score can incorporate various cybersecurity risk dimensions and their corresponding scores. Accordingly, the modeler 116 can quantify the vulnerabilities and risk of the entity. In various arrangements, a higher score may be indicative of a stronger overall cybersecurity level. For example, a higher score (e.g., 9.5 out of 10) may be reflective of a stronger overall cybersecurity level of an entity. In some arrangements, a higher score may be indicative of a lower overall cybersecurity level. For example, a higher score (e.g., 9.5 out of 10) may be indicative of a lower overall cybersecurity level of an entity.

In various arrangements, cybersecurity multi-channel data fusion operations can be performed on a plurality of entities such that each entity associated with an entity computing device can have a profile and each profile can be enriched periodically or in real-time. Entity profiles can be created, updated, and tracked by the modeler 116 such that cybersecurity risk scores and/or multi-dimensional scores can be generated, and vulnerabilities can be recorded. Entity profiles are further explained in detail with reference to FIG. 5.

In various arrangements, vulnerabilities can be determined based on any software feature, hardware feature, network feature, or combination of these, which could make an entity vulnerable to cyber threats, such as hacking activities, data breaches, and cyberattacks. In turn, cyber-threats increase the probability of cyber-incidents. Accordingly, a vulnerability can be a weakness that could be exploited to gain unauthorized access to or perform unauthorized actions in a computer network environment (e.g., computing environment 100). For example, obsolete computing devices and/or obsolete software may present vulnerabilities and/or threats in a computer network environment. In another example, certain network frameworks may present vulnerabilities and/or threats in a computer network environment. In yet another example, business practices of an entity may present vulnerabilities and/or threats in a computer network environment. In yet another example, published content on the Internet may present vulnerabilities in a computer network environment. In yet another example, third-party computing devices and/or software may present vulnerabilities and/or threats in a computer network environment. Accordingly, as shown, all devices (e.g., servers, computers, any infrastructure), all data (e.g., network information, vendor data, network traffic, user data, certificate data, public and/or private content), all practices (e.g., business practices, security protocols), all software (e.g., frameworks, protocols), and any relationship an entity has with another entity can present vulnerabilities and/or threats in a computer network environment that could lead to one or more cyber-incidents.

Accordingly, the modeler 116 can be configured to determine one or more vulnerabilities. Vulnerabilities can be determined based on receiving vulnerability datasets from a plurality of data feeds and/or querying the stored datasets in multi-channel cybersecurity assurance vault 120 (e.g., in particular, entity datasets 122, and third-part datasets 124). In various arrangements, the received vulnerabilities and queried vulnerabilities can be cross-referenced against items of data received, collected, and/or scanned by the multi-channel cybersecurity assurance system 110 (e.g., via the data acquisition engine 180 and/or multi-channel cybersecurity assurance vault 120). The received vulnerability datasets can include a list of known vulnerabilities in cybersecurity (e.g., computer hardware, software, network communication, configuration settings, and/or mitigation techniques). The queried vulnerabilities can be based on the modeler 116 providing one or more parameters to the multi-channel cybersecurity assurance vault 120 and subsequently receiving data matching (e.g., properties in subsets of data and/or packets of data) the one or more parameters to infer that a vulnerability is present. That is, utilizing the metadata (e.g., entity datasets 122, third-party datasets 124, remediation datasets 126) stored within the multi-channel cybersecurity assurance vault 120 and based on identifying properties in the metadata, inferences and determinations can be made regarding vulnerabilities if one or more parameters (or properties) match metadata of entity profiles. For example, a query could be executed by the modeler 116 that includes a parameter (or property) indicating to return all entity profiles with an open port 80 (e.g., "All Entity—Open Port 80"). In this example, the query would return each entity profile that includes an open port 80 (e.g., vulnerability). In another example, a query could be executed by the modeler 116 that includes a parameter (or property) indicating return entity profiles in the financial industry that run TellerSuite Software (e.g., "Financial Entity—Run TellerSuite Software"). In this example, the query would return each entity profile that is associated with financial industry and runs TellerSuite Software (e.g., vulnerability). In some arrangements, returning the requested values can comprise operations to retrieve updated device connectivity data and/or parse the "port" property from the data to create a subset of devices where port 80 is used. Returning the requested values can further comprise operations to ping or otherwise initiate a call to or gather data regarding the subset of devices to determine which devices have port 80 open. Collectively, these operations can be referred to as scanning operations.

In various arrangements, once vulnerabilities are determined, each identified vulnerability can be stored in a security parameters dataset (e.g., in multi-channel cybersecurity assurance vault 120) such that the security parameters dataset can be cross-referenced to identify vulnerabilities in data. In some arrangements, the security parameters dataset can also include weights assigned to individual vulnerabilities such that certain vulnerabilities can be weighted higher (e.g., indicative of increased cybersecurity risk) than other vulnerabilities.

Expanding generally on the data fusion aspects of generating the cybersecurity risk scores and multi-dimensional score in the schema of the modeler 116, each cybersecurity risk score can be representative of a cybersecurity dimension of the multi-dimensional score that can be calculated based on fusing various properties of data that have been assigned to each particular dimension. For example, a port property can be mapped to the technology security dimension.

Modeler 116 (or data manager 118) can be configured to assign dimensions to each item of data that have been received, collected, and/or scanned. Each item of data can be linked to one or more specific data channels and each cybersecurity dimension can include a plurality of items of data (collectively referred to herein as "subsets of data"). Accordingly, each cybersecurity dimension can include a subset of data that the modeler 116 can utilize to analyze and generate cybersecurity risk scores for each cybersecurity dimension. In various arrangements, each cybersecurity dimension can be incorporated into the multi-dimensional score such that standardized overall cybersecurity can be quantified. That is, each entity profile can receive a multi-dimensional score such that entity profiles can be compared, historical information can be tracked, and trends over time can be established. Accordingly, the security model described herein standardizes the generation of cybersecurity risk scores and multi-dimensional scores such that modeler 116 can provide consistent and stable multi-channel data fusion operations on entities.

For example, an illustrative scoring table below (between 0 and 10) discloses a plurality of values (e.g., sometimes referred to herein as "impact" and/or "impact values") assigned to a plurality of items (e.g., potential vulnerabilities and threats) of a specific entity (Table 1):

| Item | Dimension | Value |
|---|---|---|
| 53/tcp | Perimeter | 5 |
| Software App U | Technology | 8 |
| Server V | Technology | 1 |
| Public Content W | Intelligence | 2 |
| Firewall X | Security Controls | 9 |
| 89/udp | Perimeter | 7 |
| Access Policy | Security Controls | 8 |
| Encryption Y | Security Controls | 5 |
| Private Content Z | Intelligence | 6 |

As shown, the values assigned by the modeler 116 can be based on retrieving values of items from a lookup table or by a user entering values. In some arrangements, the impact values represent a Federal Information Processing Standard (FIPS) Publication 199 confidentiality impact level. In some arrangements, the impact values are determined based on suitable vulnerability database risk-scoring methodologies, such as the Common Vulnerability Scoring System (CVSS). In some arrangements, the impact values are defined by another entity or organization, which can be internal or external to the entity that manages and/or operates the systems described herein. For example, the impact values can be based on raw scores assigned to various attack vectors, which may be scored according to how easily the underlying vulnerabilities can be exploited. In some arrangements, the impact values can be received and/or determined using data intelligence collection, penetration testing, system administration data, and/or data related to various security-related technical tasks. Accordingly, in some arrangements, the source data for deriving and assigning the impact values can be retrieved from system administration logs, operations logs, and/or access logs, any of which may be automatically generated by the respected source system(s) in the course of system operation. In one example and as shown above, "Software App U" was assigned a value of 8, which could indicate "Software App U" is more vulnerable or poses a larger threat to cybersecurity, whereas "Server V" was assigned a value of 1, which could indicate "Server V" is less vulnerable or poses a reduced threat to cybersecurity. In various arrangements, each item in the subsets of data can be given a value by the modeler 116.

In another example, an illustrative visibility table (sometimes referred to as "attack surfaces") below discloses instances discovered through scanning and assigned to a plurality of properties (e.g., potential vulnerabilities and threats) of a specific entity (Table 2):

| Item | Discovered Instances |
|---|---|
| 53/tcp | 7 |
| Software App U | 3 |
| Server V | 15 |
| Public Content W | 29 |
| Firewall X | Y |
| 89/udp | 4 |
| Access Policy | Y |
| Encryption Y | N |
| Private Content Z | 1 |

As shown, the values assigned above by the modeler 116 can be a count of instances a specific item was located and/or determined based on the received, collected, and/or scanned entity data, such that the number of discovered instances is reported relative to the number of IP traffic packets or to the number of unique source entities, destination entities, port numbers, MAC addresses, IP addresses, or communication protocols in the data set of IP traffic packets returned by a particular scan operation. Further, as shown, the security controls dimension (sometimes referred to herein as "mitigating security dimension") can be given a "Y" or "N" such that "Y" is indicative of the item being discovered and "N" is indicative of the item not being discovered. In one example and as shown above, "Software App U" was discovered to have 3 instances on the computer network environment of the entity and/or associated with the entity, whereas "Server V" was discovered to have 15 instances on the computer network environments of the entity and/or associated with the entity.

With reference to Table 1 and Table 2 above, the illustrative scoring table and illustrative visibility table can be combined to generate a combined table of a plurality of items of a specific entity (Table 3):

| Item | Dimension | Value | Discovered Instances |
|---|---|---|---|
| 53/tcp | Perimeter | 5 | 7 |
| Software App U | Technology | 8 | 3 |
| Server V | Technology | 1 | 15 |
| Public Content W | Intelligence | 2 | 29 |
| Firewall X | Security Controls | 9 | Y |
| 89/udp | Perimeter | 7 | 4 |
| Access Policy | Security Controls | 8 | Y |

-continued

| Item | Dimension | Value | Discovered Instances |
|---|---|---|---|
| Encryption Y | Security Controls | 5 | N |
| Private Content Z | Intelligence | 6 | 1 |

In various arrangements, a variety of computational operations can be performed by the modeler 116 to generate a cybersecurity risk score for each dimension. An example equation for the generating a cybersecurity risk score for a specific dimension can be found in the equation below (Equation 1):

$$\{T, P, I\} = \max(10, \sqrt{\bar{x} * x_{max}} + \frac{\sum_{i=1}^{n} x_i \in \{8\}}{\sum_{j=1}^{n} [x_j]} + \frac{\sum_{i=1}^{n} x_i \in \{9\}}{\sum_{j=1}^{n} [x_j]} + \frac{\sum_{i=1}^{n} x_i \in \{10\}}{\sum_{j=1}^{n} [x_j]}$$

The following table describes the notation as it shall be used hereafter. The notation is denoted as follows:
T: Technology Security Dimension
P: Perimeter Security Dimension
I: Intelligence Security Dimension
$x_{max}$: Maximum value
$\bar{x}$: Average value A calculation of a cybersecurity risk score for the technology security dimension utilizing Equation 1 is shown below (with reference to Table 3):

Software *App U*–345instances of value 8

Server*U*–15instances of value 1

Mean(Average)value: 8+1/3+15=8.05

Maximum value:Max(8,1)=8

Square Root of Product: $\sqrt{0.025 * 8} = 0.2$ where adjustments can be made for value 8's, 9's and 10's such that vulnerabilities and threats can be emphasized (e.g., weighted). In various arrangements, weights can be added or removed from any value.

$$\frac{\sum_{i=1}^{n} x_i \in \{8\}}{\sum_{j=1}^{n} [x_j]} =$$

3 instances of value 8 of total of 2 items $= \frac{3 \text{ eights}}{2 \text{ items}} = \frac{3}{2} = 1.5$ $$\frac{\sum_{i=1}^{n} x_i \in \{9\}}{\sum_{j=1}^{n} [x_j]} = 0$$

$$\frac{\sum_{i=1}^{n} x_i \in \{10\}}{\sum_{j=1}^{n} [x_j]} = 0$$

where the integration of all the calculation can generate a cybersecurity risk score for the technology security dimension:

$\{T\} = \max(10, 8.05 + 1.5 + 0 + 0) = 9.55$ where the lower the score for Equation 1 may be indicative of increased cybersecurity (decreased threat level).

In various arrangements, similar operations and calculations can be performed to generate various cybersecurity risk scores for various dimensions. To further the example above, the additional cybersecurity risk scores can be as follows:

Perimeter Cybersecurity Score=$\{P\}$=8.29

Intelligence Cybersecurity Score=$\{I\}$=4.63

An example of generating a security controls score (sometimes referred to herein as "mitigating security score") for the security controls dimension is shown below (Equation 2):

$$\{C\} = \frac{\text{Sum of Control Values}}{100}$$

A calculation of a cybersecurity risk score for the security controls dimension utilizing Equation 2 is shown below (with reference to Table 3):

$$\frac{9+8}{100} = 0.17$$

where the higher the score for Equation 2 may be indicative of increased cybersecurity.

In various arrangements, the cybersecurity dimensions can be aggregated to generate a multi-dimensional score for an entity profile. Generating a multi-dimensional score for the cybersecurity dimensions is shown below (Equation 3):

$$\{M\} = \left(\frac{\{I\} + \{P\} + \{T\}}{3}\right) - \{S\}$$

A calculation of a multi-dimensional score utilizing Equation 3 is shown below (with reference to above cybersecurity risk scores):

$$\{M\} = \left(\frac{4.63 + 8.29 + 9.55}{3}\right) - 0.17 = 7.32$$

where the lower the score for Equation 3 may be indicative of increased cybersecurity.

One of skill will appreciate that Equations 1-3 herein are representative of a particular arrangement and/or group of arrangements and other arrangements are contemplated. The risks of a given individual item may be re-assessed periodically (for example, as a technology matures and becomes more or less secure). As such, the risk scoring and measuring algorithms should be reviewed regularly, and may be updated as the system is refined. Accordingly, in various arrangements, properties parsed from device connectivity data can be included in (mapped to) a particular security dimension (e.g., the technology dimension, the perimeter security dimension, the intelligence security dimension) based on any of the following non-exclusive list of items: device data, application data, infrastructure component data, device connectivity data, and IP traffic data. Various roll-up aggregation methods, including counts, averages, median values, mode values, and various statistical data (percentiles, time series data, etc.) can be used to calculate the score. Various data analysis techniques may be used to normalize the data, generate projections, etc. For example, data can be normalized via linear scaling, log scaling, clipping, z-scoring, etc. Data can be used as a basis for generating projections using regression, moving averages, weighted values (e.g., weighted averages), etc.

Accordingly, in operation, a scan may return device connectivity data. Device connectivity data can be parsed to identify a particular infrastructure component, such as a web server's operating system version. The particular infrastructure component can be included in a particular security dimension, such as the technology security dimension. One or more vulnerabilities and impact values can be determined for the particular infrastructure component based at least in part on the data received via various additional data sources. A count of identified occurrences for each vulnerability may be determined and assigned an impact value. The data can be weighted and/or otherwise aggregated according to the impact value, number of occurrences, or other factors. Data analysis and/or machine learning techniques, systems, and/or methods can be applied to the data to generate one or more projections. Based on the weighted and/or otherwise aggregated data and based on the projection(s), a security score for the particular dimension can be calculated. The security score can be aggregated with other security scores for other items indicated by the received device data, application data, infrastructure component data, device connectivity data, and/or IP traffic data to arrive at the score for the particular dimension and/or a multi-dimensional score.

In various arrangements, a multi-dimensional score can be categorized based on a variety of rules and/or factors. In one example, the categories could be low, medium, high, and critical, (e.g., according to the nomenclature used in the CVSS), National Institute of Standards and Technology (NIST) cybersecurity framework, or another suitable nomenclature) where each category can be defined based on a scoring chart. That is, low could be defined as a multi-dimensional score between 0.0-3.99, medium could be defined as a multi-dimensional score between 4.0-6.99, high could be defined as a multi-dimensional score between 7.0-10.00, and critical could be defined as a multi-dimensional score above 10.00. Accordingly, with reference to the above multi-dimensional score, the entity with the score 7.32 may be categorized as high. In some arrangements, each category may include requirements and/or rules for an entity to follow. The rules can include computer-based operations (e.g., initiate a temporary communication shutoff until a multi-dimensional score goes below a certain value, require certain changes to the computer network environment of an entity such as disabling a port and/or taking an infrastructure component offline, perform various other remediation actions). In some arrangements, entities categorized as low may need to be enriched less frequently (e.g., every week), whereas entities categorized as critical may need to be enriched more frequently (e.g., in real-time, every 5 minutes, every hour, every day).

In some arrangements, weights can be given to specific dimensions such that cybersecurity risk scores can be modified utilizing an arithmetic operation. In one illustrative example, the intelligence security score may be multiplied by a factor of 0.5. In various arrangements, the number of cybersecurity dimensions can be added or removed such that additional calculations for additional cybersecurity dimensions can be generated and the equations (e.g., Equation 1, 2, and 3) can be updated accordingly and/or fewer calculations for fewer cybersecurity dimensions can be generated and the equations can be updated accordingly.

Accordingly, as multi-dimensional scores and cybersecurity risk scores change and/or are updated based on multi-channel fusion operations, a remediation system 114 can be configured to actively execute (e.g., in real-time) various operations that override default operations of the respective computing system where the vulnerability was identified. In various arrangements, the remediation system 114 can determine actions (e.g., proactive, reactive, and mitigation operations) responsive to fusing multi-channel data and generating scores. In one arrangement, proactive actions can include identifying and addressing potential vulnerabilities and/or threats before a cyber-incident occurs. In another arrangement, reactive actions can include identifying and addressing potential vulnerabilities and/or threats contemporaneously with a cyber-incident or after a cyber-incident occurs. In yet another arrangement, mitigation actions can include implementing computer-based policies and processes to reduce the possibility of future cyber-incidents.

In various arrangements, the predetermined threshold can be set by a user or identified by one or more processing circuits (e.g., modeler 116) based on analyzing the entity data. Predetermined thresholds can be based on inequalities (e.g., greater then, less then, between), Boolean algebra (e.g., and, or, nor), binary logic (e.g., truth table, tautologies, and logical equivalences), and/or equations (e.g., quadratic, linear, radical, exponential, rational).

In various arrangements, other operations can include trending, pattern recognition, and notification operations. Trending and pattern recognition operations can be executed to identify trends and/or patterns in various entity data (e.g., historical multi-dimensional scores, historical cybersecurity risk scores, historical vulnerabilities, historical threats, and/or any other historical entity data properties). That is, based on evaluating entity datasets 122 and/or third-party datasets 124, and based on generating multi-dimensional scores and/or cybersecurity risk scores, one or more processing circuits of the modeler 116 can identify trends and/or patterns (e.g., linear, exponential, seasonality, random, damped window, stationary, AI, and/or cyclical trends and/or patterns) of the various entity data. The notification operation may be executed in response to trends and/or pattern recognition operations. The notification operations can provide alerts to various computing devices (e.g., multi-channel cybersecurity assurance system 110, user devices 140, entity devices 150, third-party devices 155, data sources 160).

The multi-channel cybersecurity assurance system 110 can include a remediation system 114. In various arrangements, the remediation system 114 can be configured to track and provide remediation actions to entity profiles. In various arrangements, the remediation system 114 can determine appropriate system actions responsive to identifying trends, patterns, and providing notifications. The remediation system 114 can analyze the received, collected, and tracked data performed by the modeler 116 to determine (e.g., generate recommendations for) various remediation items. Remediation items can be any item identified in the data fusion operations that could be a potential vulnerability or threat to the scanned entity and/or any other entity that has a relationship with the scanned entity. Remediation items can be stored in the remediation dataset 126 of the multi-channel cybersecurity assurance vault 120, and remediation actions can be generated and provided to an entity and/or any other entity that has a relationship with the entity. In various arrangements, the remediation actions can be any a specific action and/or actions that the scanned entity and/or any other entity that has a relationship with the scanned entity should remediate.

For example, if it is determined that port 40 is open on computing device X, a remediation item may be generated and stored in the remediation datasets 126 and a remediation action may be generated and sent to the entity requesting that port 40 be closed on computing device X. In another example, if it is determined there is a vulnerability with Software Y, a remediation item may be generated and stored in the remediation datasets 126 and a remediation action may be generated and transmitted to the entity requesting that Software Y be uninstalled on all computing devices. In both examples, each remediation item can be tracked such that historical data and trend data can stored in the remediation datasets 126. Further in both examples, in subsequent data fusion operations, the remediation system 114 can determine if one or more remediation items have been remediated.

In various arrangements, the remediation system 114 can independently verify, separate from a data fusion operation, that a remediation item has been completed by scanning the plurality of data channels for entity data, receiving new or updated device connectivity data and/or IP traffic data and fusing this data to determine an updated cybersecurity score.

In various arrangements, the remediation system 114 can generate a long term trend summary associated with the entity and based on the detected vulnerabilities and progress of the at least one remediation. The long term trend summary can be included in the user-interactive cybersecurity dashboard. In various arrangements, the long term trend summary can include various graphs, charts, pictures, statistics indicating current vulnerabilities, current remediation items, deadlines for remediating the remediation items, cybersecurity risk scores and trends, multi-dimensional scores and trends. Additional details associated with the remediation system 114 and long term trend summaries is described further with reference to FIGS. 6-10.

Figure 2:
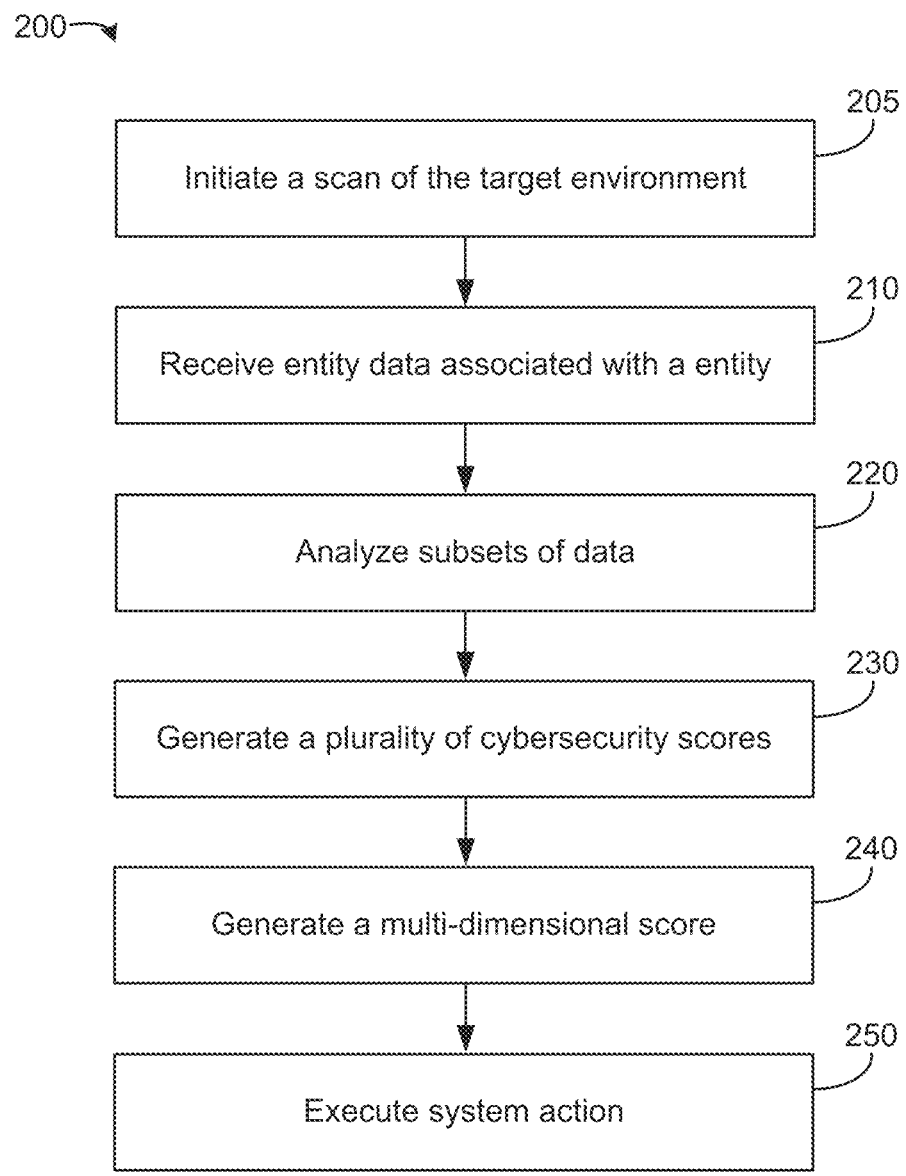
FIG. 2 is a flowchart for a method of analyzing multi-channel data based on a security model in a computer network environment, according to some arrangements.

Referring now to FIG. 2, a flowchart for a method 200 of fusing multi-channel data based on a security model in a computer network environment is shown, according to some arrangements. Multi-channel cybersecurity assurance system 110 and computing environment 100 can be configured to perform method 200.

In broad overview of method 200, at block 205, the one or more processing circuits (e.g., multi-channel cybersecurity assurance system 110 in FIG. 1, computer system 1100 in FIG. 11) initiate a scan of a target computer network environment. At block 210, one or more processing circuits receive entity data associated with an entity. At block 220, the one or more processing circuits analyze subsets of data. At block 230, the one or more processing circuits generate a plurality of cybersecurity risk scores. At block 240, the one or more processing circuits generate a multi-dimensional score. At block 250, the one or more processing circuits execute a system action (e.g., a remediation action). Additional, fewer, or different operations may be performed depending on the particular arrangement. In some arrangements, some or all operations of method 200 may be performed by one or more processors executing on one or more computing devices, systems, or servers. In various arrangements, each operation may be re-ordered, added, removed, or repeated.

Referring to method 200 in more detail, at block 205, the one or more processing circuits (e.g., multi-channel cybersecurity assurance system 110 in FIG. 1) can initiate a scan of the target computer network environment via the data acquisition engine 180 of FIG. 1. The target computer network environment can be identified by a unique identifier, such as a domain identifier (e.g., a top-level domain (TLD) identifier, a subdomain identifier, a URL string pointing to a particular directory), an IP address, and/or a subnet. Further, the target computer network environment can be defined with more granularity to encompass a particular component (e.g., an entity identified by an IP address, applications/operating systems/exposed API functions associated with a particular port number, IP address, subnet, and/or domain identifier). In some arrangements, one or more particular target computer network environments can be linked to an entity profile (e.g., in the entity datasets 122 of FIG. 1). According to various arrangements, scanning operations can be executed according to a class/tier of the target infrastructure and/or on-demand. In some arrangements, scanning includes generating and transmitting to the target system a request for access-controlled information, the request comprising authentication information. In some arrangements, instead or in addition to performing a scan, a scanless operation can be initiated to identify existing (e.g., cached, previously stored) entity profile information. Advantageously, in the event the perimeter of the system needs to be secured such that Internet communications are undesirable, a scanless operation can help identify vulnerabilities without gaining system exposure to external entities.

Referring to method 200 in more detail, at block 210, the one or more processing circuits can receive, via one or more data channels (e.g., via the data acquisition engine 180), entity data associated with an entity, wherein the entity data includes subsets of data associated with specific data channels or data sources. Each data channel of the plurality of data channels may be communicatively connected to the one or more processing circuits via a data channel communication network such that each data channel can be a computing device (e.g., user devices 140, entity devices 150, third-party devices 155, data sources 160) that can store data. In various arrangements, the entity data of an entity can contain items such that a plurality of items can be included in the subsets of data. In some arrangements, each data channel may include a subset of data such that the entity data can be subsets of data. For example, subsets of data can include properties parsed from device connectivity data and/or packet segments parsed from IP traffic data. The one or more processing circuits can also analyze network properties and network information of a target computer network environment associated with the entity. Further, the one or more processing circuits can also collect entity data by querying a plurality of data sources (e.g., user devices 140, entity devices 150, third-party devices 155, data sources 160). In some arrangements, analyzing network properties and network information of a target computer network environment associated with the entity can be based on evaluating domain and subdomain Internet protocol (IP) traffic and/or based on additional relevant intelligence data collected internally or via third-party systems.

At block 220, the one or more processing circuits can analyze the subsets of data comprising assigning each subset of data to a specific cybersecurity dimension of a plurality of cybersecurity dimensions based on correlating one or more properties of the subset of data to one or more vulnerabilities of the subsets of data to determine an impact of each vulnerability.

Assigning the subsets of data can be based on various rules and/or factors. In various arrangements, each cybersecurity dimension can include specific properties or characteristics such that each subset of data can be assigned to one or more cybersecurity dimensions (e.g., intelligence, technology, perimeter, security controls) that best matches the specific characteristics of the cybersecurity dimension as shown, for example, in FIG. 6. In various arrangements, each subset of data can include properties such that the properties of each subset of data can be analyzed to determine one or more vulnerabilities and the impact of each vulnerability. Properties can include any data parsed from device connectivity data. Additionally, properties can include timestamps (e.g., date, time), domain relationships (domain IP traffic, domain outbound and inbound connections, domain average traffic, domain packet size, domain name system (DNS)), subdomain relationships (subdomain IP traffic, subdomain outbound and inbound connections, subdomain average traffic, subdomain packet size, subdomain name system (DNS), and network environment (computing devices, infrastructure, software, databases, Internet protocols, logs).

In some arrangements in data fusion operations, some subsets of data can be discarded based on a determination of duplicate data (e.g., data deduplication). In particular, the one or more processing circuits can analyze the subsets of data based on their properties and remove duplicate records from the entity data. Data deduplication can be utilized to improve storage utilization and network data transfers to reduce the number of bytes that are transmitted and preserve or increase the bandwidth available to other system operations.

At block 230, the one or more processing circuits can generate a plurality of cybersecurity risk scores based at least on the detected one or more vulnerabilities and the impact of each vulnerability, wherein each cybersecurity risk score is associated with one of the plurality of cybersecurity dimensions. In various arrangements, each cybersecurity risk score can be unique and be indicative of the cybersecurity of a specific dimension of an entity. Each entity may be associated with an entity profile such that the cybersecurity risk scores can be associated with the entity profile of the entity. In some arrangements, the generated plurality of cybersecurity risk scores can include performing various arithmetic computations and weighting various computations such that various computations can have greater influence or less influence on the cybersecurity dimensional score.

At block 240, the one or more processing circuits can generate a multi-dimensional score based on aggregating the plurality of cybersecurity risk scores. Aggregating the plurality of cybersecurity risk scores can include performing various arithmetic computations on the cybersecurity risk scores and weighting various cybersecurity risk scores such that have greater influence or less influence on the multi-dimensional score.

At block 250, the one or more processing circuits can execute a system action responsive to evaluating the multi-dimensional score and/or the identified vulnerabilities. For example, in response to identifying a multi-dimensional score of an entity being above a predetermined threshold (e.g., greater than 10, greater than or equal to 10), a task may be executed that disables all or at least some communication (e.g., email, file uploads, any other network communication) between an entity and one or more other entities. In another example, in response to identifying a specific port is open (e.g., port 40, port 92), a shut down (or close) task may be executed on the port that is open such that the communications interface associated with the port is disabled. In yet another example, in response to a determination of a failure or abnormal termination of a previously active computer server, a switching (e.g., sometimes referred to as "failover") task can be executed to failover to a redundant or standby computer server. In yet another example, in response to a determination of a failure or abnormal termination of a previously active segment of a network, a switching (e.g., sometimes referred to as "failover") task can be executed to failover to a redundant or standby segment of the network. In yet another example, in response to identifying an attack (e.g., a DDOS attack, code injection) on a target computer environment, a task can be executed redirecting network traffic to a specific IP address to a decoy non-production environment where production resources cannot be compromised by the attack. In yet another example, a remediation recommendation and/or related executables can be generated and transmitted to the target computer system. The system actions described herein can be executed on internal systems and/or included in a remediation recommendation for execution on the relevant external system where the vulnerability is identified.

Figure 3:
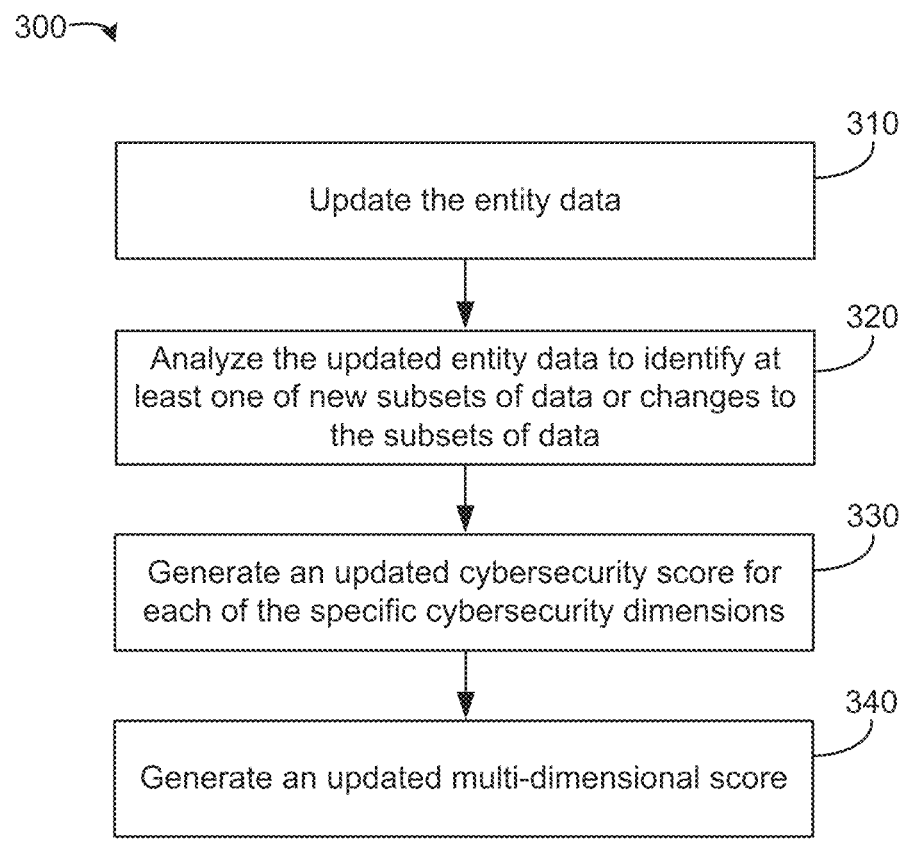
FIG. 3 is a flowchart for a method of analyzing multi-channel data based on a security model in a computer network environment, according to some arrangements.

Referring now to FIG. 3, a flowchart for a method 300 of updating security model data in a computer network environment is shown, according to some arrangements. Multi-channel cybersecurity assurance system 110 and computing environment 100 can be configured to perform operations of the method 300.

In broad overview of method 300, at block 310, one or more processing circuits (e.g., multi-channel cybersecurity assurance system 110 in FIG. 1, computer system 1100 in FIG. 11) update the entity data. At block 320, the one or more processing circuits analyze the updated entity data to identify at least one of a new subsets of data or changes to the subsets of data. At block 330, the one or more processing circuits generate an updated cybersecurity risk score for each of the specific cybersecurity dimensions. At block 240, the one or more processing circuits generate an updated multi-dimensional score. Additional, fewer, or different operations may be performed depending on the particular arrangement. In some arrangements, some or all operations of method 300 may be performed by one or more processors executing on one or more computing devices, systems, or servers. In various arrangements, each operation may be re-ordered, added, removed, or repeated.

Referring to method 300 in more detail, at block 310, the one or more processing circuits (e.g., multi-channel cybersecurity assurance system 110 in FIG. 1) can update the entity data based on receiving additional, updated or new data via the plurality of data channels. In various arrangements, updating the entity data can include adding additional data channels based on identifying additional Internet-connected entities (e.g., new computer added to the network, new news outlet). In some arrangements, updating can occur in real-time such that entity data is continuously updated. In other arrangements, updating can occur based on a difference in a period of time between the most recently generated plurality of cybersecurity risk scores that is before the generation of the updated cybersecurity risk score for each of the specific cybersecurity dimensions. In some arrangement, the previous entity data can be saved in a database (e.g., multi-channel cybersecurity assurance vault 120) such that historical data and trends can be identified.

At block 320, the one or more processing circuits can analyze the updated entity data to identify at least one of new subsets of data or changes to the subsets of data associated with the most recent receipt occurring before the receipt of additional data. In various arrangements, the one or more processing circuits can compare previously stored data (e.g., in multi-channel cybersecurity assurance vault 120) with the updated entity data to determine if a change in the subsets of data occurred. In another arrangement, the one or more processing circuits can identify a new subset of data based on cross-referencing various data sources.

At block 330, the one or more processing circuits can, in response to determining at least one a new subset of data or a change to at least one previous subset of data, generate an updated cybersecurity risk score for each of the specific cybersecurity dimensions. The updated cybersecurity risk score can be re-associated with the entity profile of the entity. In various arrangements, the updated cybersecurity risk score may be indicative of additional vulnerabilities or threats previously not identified. In some arrangement, the cybersecurity risk scores can be saved in a database (e.g., multi-channel cybersecurity assurance vault 120) such that historical data and trends can be identified.

At block 340, the one or more processing circuits can generate an updated multi-dimensional score based on aggregating the plurality of cybersecurity risk scores. In various arrangements, the previous multi-dimensional scores can be saved in a database (e.g., multi-channel cybersecurity assurance vault 120) such that historical data and trends can be identified.

Figure 4:
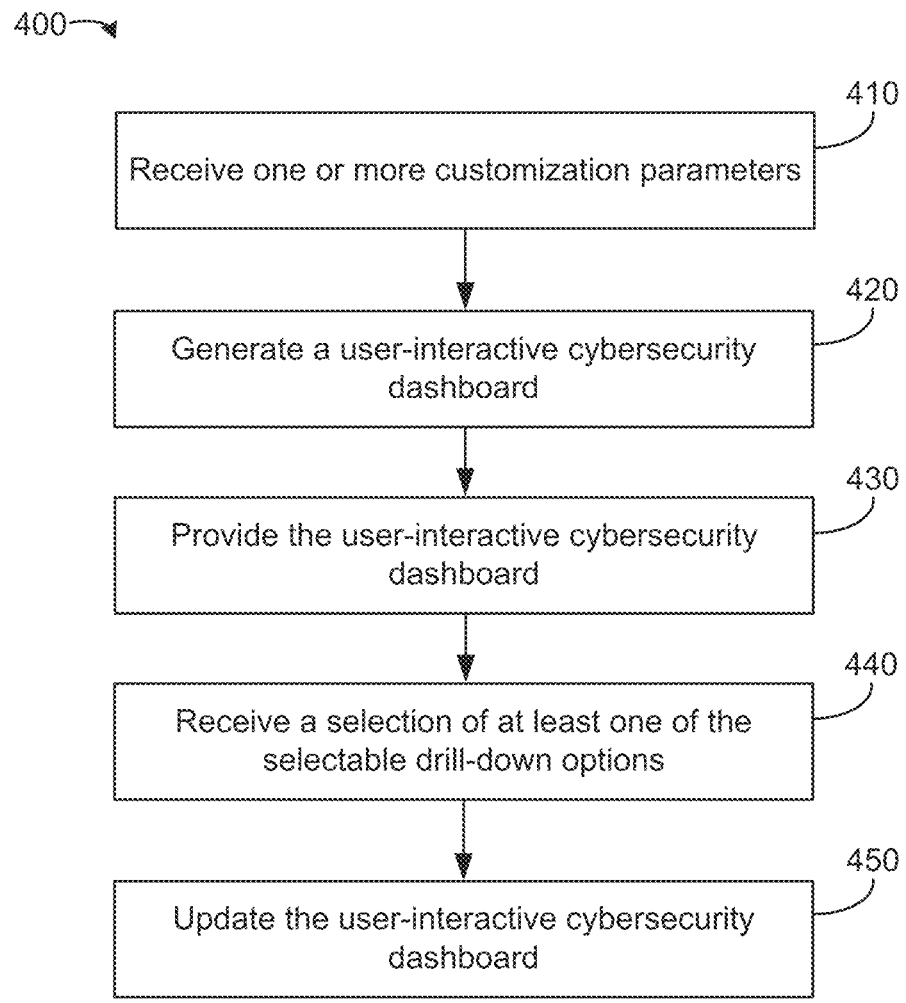
FIG. 4 is a flowchart for a method of providing a user-interactive cybersecurity dashboard, according to some arrangements.

Referring now to FIG. 4, a flowchart for a method 400 of providing a user-interactive cybersecurity dashboard is shown, according to some arrangements. The multi-channel cybersecurity assurance system 110 and computing environment 100 can be structured to perform method 400.

In broad overview of method 400, at block 410, one or more processing circuits (e.g., multi-channel cybersecurity assurance system 110 in FIG. 1, computer system 1100 in FIG. 11) receive one or more customization parameters. At block 420, the one or more processing circuits generate a user-interactive cybersecurity dashboard. At block 430, the one or more processing circuits provide the user-interactive cybersecurity dashboard. At block 440, the one or more processing circuits receive a selection of at least one of the selectable drill-down options. At block 450, the one or more processing circuits update the user-interactive cybersecurity dashboard. Additional, fewer, or different operations may be performed depending on the particular arrangement. In some arrangements, some or all operations of method 300 may be performed by one or more processors executing on one or more computing devices, systems, or servers. In various arrangements, each operation may be re-ordered, added, removed, or repeated.

Referring to method 400 in more detail, at block 410, the one or more processing circuits (e.g., multi-channel cybersecurity assurance system 110 in FIG. 1) can receive, via a computing device of an institution, one or more customization parameters. In various arrangements, a user associated with the institution can set one or more customization parameters. In various arrangements, the customization parameters can be any parameters that can adjust the look and feel of a user-interactive cybersecurity dashboard (sometimes referred to herein as a "user-interactive interface"). For example, the customization parameter could relate to color schemes, height and/or width of items and/or panels on the user-interactive cybersecurity dashboard, the entity profiles utilized (e.g., all, by line-of-business, by industry), and/or language (e.g., English, Spanish, French).

At block 420, the one or more processing circuits can generate a user-interactive cybersecurity dashboard based on the entity data and the customization parameters, wherein the user-interactive cybersecurity dashboard includes one or more graphical user interfaces. In various arrangements, the user-interactive cybersecurity dashboard can generate panels for the user-interactive cybersecurity dashboard. In some arrangements, the panels can include a variety of data and options.

At block 430, the one or more processing circuits can provide, to the computing device of the institution, the user-interactive cybersecurity dashboard, wherein the user-interactive cybersecurity dashboard is presented on a display of the computing device. The user-interactive cybersecurity dashboard can be rendered at a computing device (e.g., user devices 140, entity devices 150, third-party devices 155) to facilitate interactions and analyze various entity data, cybersecurity risk scores, performance metrics, trends, tracking, and/or remediation items associated with one or more entity profiles. In various arrangements, the user-interactive cybersecurity dashboard can be generated, updated and/or monitored by the content management system 170 in FIG. 1.

At block 440, the one or more processing circuits can receive, via the user-interactive cybersecurity dashboard, a selection of at least one of the selectable drill-down options. In various arrangements, a variety of data and entities can be categorized and/or grouped together based on a variety of characteristics, such as line-of-business, subsidiary, department, location, industry, and/or financial trends.

At block 450, the one or more processing circuits can, in response to receiving the selection, update, by the one or more processing circuits, the user-interactive cybersecurity dashboard based on the entity data and the selection. In various arrangements, the user-interactive cybersecurity dashboard can be updated to include the data of the selected drill-down option. For example, in response to a selection of drill-down option to drill-down to marketing and sales line-of-business, the one or more processing circuits may update trends, scores, and graphs such that the user-interactive cybersecurity dashboard displays only the marketing and sales line-of-business data.

Figure 5:
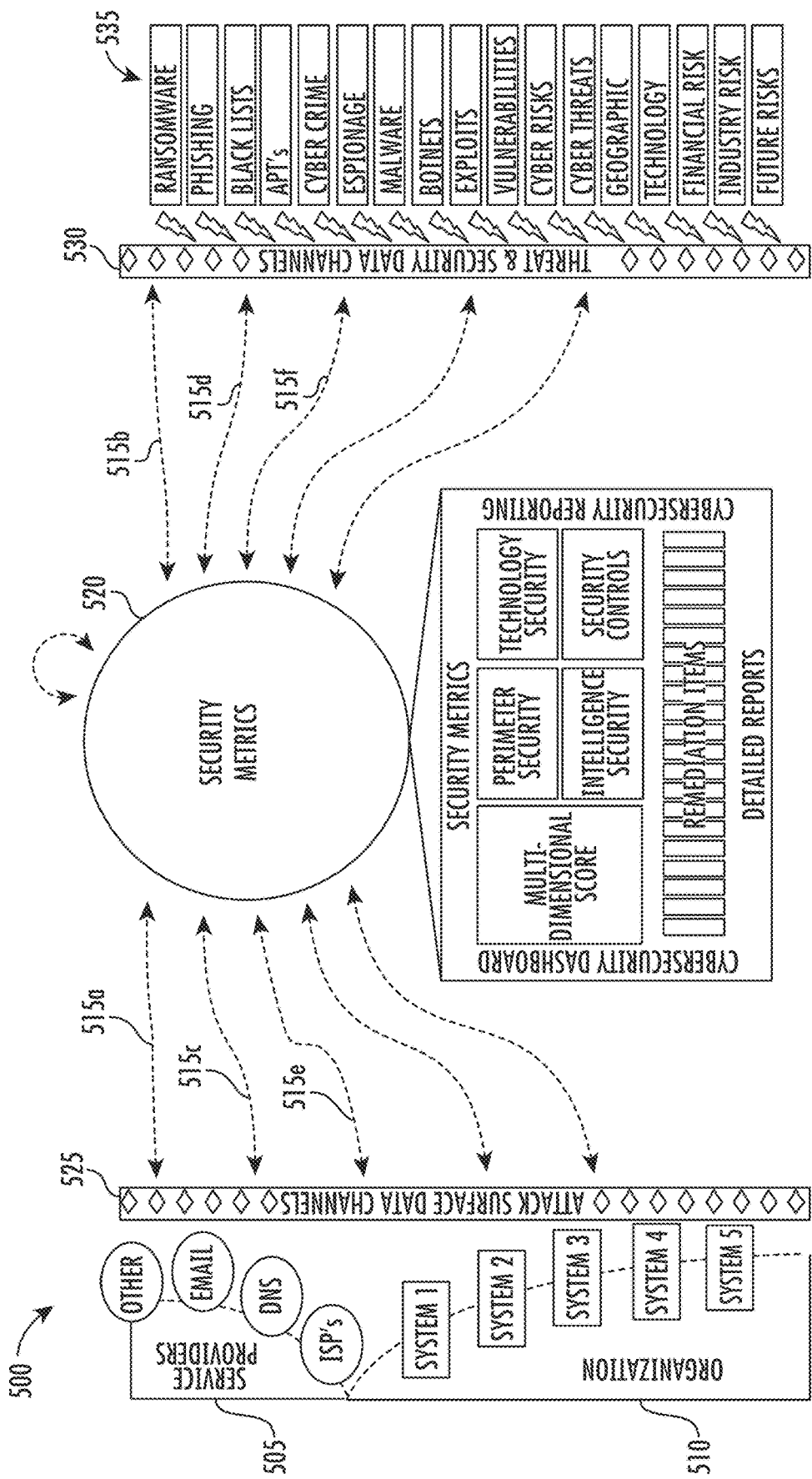
FIG. 5 is a block diagram depicting an example of a security architecture, according to some arrangements.

Referring now to FIG. 5, a block diagram depicting an example of a security architecture 500 is shown, according to some arrangements. The computing environment is shown to include service entity data sources 505, organization data sources 510, data channel communication networks 515*a* and 515*b*, attack surface data channels 525, threat and security (T&S) data channels 530, and threat and security (T&S) data sources 535. The security architecture 500 may include features and functionality described above in detail with reference to FIG. 1. In various arrangements, the security architecture can be implemented utilizing various types of digital electronic circuitry (e.g., one or more processing circuits, algorithms, in computer software). In some arrangements, the security architecture can be implemented utilizing a machine learning algorithm (e.g., a neural network, convolutional neural network, recurrent neural network, linear regression model, sparse vector machine, or any other algorithm known to a person of ordinary skill in the art). The security architecture 500 can be communicatively coupled to other architectures, such as over a network 130, as described in detail with reference to FIG. 1. The security architecture 500 can have an internal logging system that can be utilized to collect and/or store data (e.g., in a multi-channel cybersecurity assurance vault 120, as described in detail with reference to FIG. 1). In some arrangements, the security architecture 500 can be executed on one or more processing circuits, such as those described herein in detail with reference to FIGS. 1 and 11. In various arrangements, the security metrics model 520 comprises features and functionality as the multi-channel cybersecurity assurance system 110 in FIG. 1. For example, the security metrics model 520 can comprise executable code for executing multi-channel data and/or pipeline fusion operations, data storage entities to store entity profiles relationally linked to fused data, etc.

Expanding generally on the security metrics model 520, in various arrangements, the one or more processing circuits of the security metrics model 520 can be communicatively coupled to various data channels (e.g., 525 and 530) via data channel communication networks (e.g., 515a, 515b, 515c, 515d, 515e, 515f). The various data channels can connect, via the data channel communication networks, to various data sources (e.g., 505, 510, and 535) that provide various data that can be utilized to quantify cybersecurity of various entities (e.g., providers, users, institutions). Accordingly, the one or more processing circuits of the security model metrics 520 can receive, scan, and collect various data from various data sources such that multi-channel data fusion operations can be performed to generate one or more cybersecurity risk scores, and/or multi-dimensional scores. In various arrangements, the various data can be divided into subsets of data (e.g., by data channel, by vendor, by line-of-business).

The one or more processing circuits of the security metrics model 520 can utilize the generated scores and multi-channel data fusion operations to generate cybersecurity dashboards, cybersecurity reports, and remediation items and/or remediation actions such that entities and users can utilize the information to detect and address cybersecurity vulnerabilities, monitor relationships (e.g., network relationships, hardware relationships, financial relationships) between entities and users, and quantify cybersecurity for entities and users, to improve overall avoidance and prevention of cybersecurity incidents (e.g., hacking activities, data breaches, cyberattacks, and other detrimental cyber-incidents).

In some arrangements, an institution may utilize the one or more processing circuits of the security architecture 500 to create profiles for entities (sometimes referred to as "providers" and/or "vendors"). In various arrangements, the profiles may be variously organized and/or categorized (e.g., industry, market capitalization (market cap), earnings, public/private, headquarters location, financial health). The entity profiles can be further divided into entity specific organization and categories (e.g., line-of-business, subsidiary, department, location). In some arrangements, the creation of a profile can be referred to herein as "initial data fusion operations", and the updating of a profile can be referred to herein generally as a "data fusion operations". Initial data fusion operations can include the creation of an entity profile such that entity information is added to the entity profile (e.g., industry, market capitalization (market cap), earnings, public/private, headquarters location, financial health). Initial data fusion operations can also include the initial receipt, scan, and collection of entity data from various data sources (e.g., 505, 510, and 535) associated with various data channels (e.g., 525 and 530) via data channel communication networks (e.g., 515a, 515b, 515c, 515d, 515e, 515f). Furthermore, data fusion operations can refer to updating the entity data based on receiving, scanning, and collecting of entity data from various data sources (e.g., 505, 510, and 535) associated with various data channels (e.g., 525 and 530) via data channel communication networks (e.g., 515a, 515b, 515c, 515d, 515e, 515f) at a point in time after the initial data fusion operations. That is, data fusion operations can be performed a plurality of times. In various arrangements, data fusion operations can be performed in real-time such that the entity data is continuously updated. In some arrangements, data fusion operations can be performed based on a difference in a period of time between the most recent data fusion operation (e.g., 15 nanoseconds, 2 milliseconds, 5 seconds, 1 minute, 3 hours, 12 hours, 1 day, 2 weeks).

In various arrangements, each profile of the plurality of profiles may be given a class/data fusion scheduling classification (e.g., tier I, tier II, tier III) such that profiles may be enriched or tracked based on the class. For example, Company X may be tier I, Company Y may be tier II, and Company Z may be tier III. In this example, Company X may be required to be enriched in real-time, whereas Company Y may be required to be enriched at least every 5 days, and whereas Company Z may be required to be enriched at least every 2 weeks. Accordingly, classes may be given to various profiles based on various rules and/or factors such as industry type (e.g., financial, construction, engineering), historical cyber-incidents (e.g., profile may be tier I if they had a cyber-incident in last 3 days, profile may be tier II if they have not had a cyber-incident in 3 months), trends (e.g., 6 cyber-incidents in past 3 hours), any multi-channel data fusion operations performed by security metrics model 520, and/or a combination of rules and/or factors (e.g., a particular profile can be tier I if they are in the financial industry and 5 cyber-incidents occurred in the last hour). In some arrangements, a profile can change classes such that classes can be determined and modified based on various rules and/or factors.

In various arrangements, the initial and subsequent data fusion operations can also include analyzing, by the one or more processing circuits of the security metrics model 520, subsets of data (e.g., entity data) including assigning each item in the subset of data to a specific cybersecurity dimension (e.g., perimeter security, technology security, intelligence security, security controls) of a plurality of cybersecurity dimensions and detecting one or more vulnerabilities of the subsets of data to determine an impact of each vulnerability. That is, each specific cybersecurity dimension can be indicative of particular information and/or associated with an entity. In some arrangements, the plurality of cybersecurity dimensions can include at least one of a perimeter security dimension, a technology security dimension, an intelligence security dimension, and security controls dimension. In various arrangements, a plurality of profiles for a plurality of entities can be created.

Expanding generally on the perimeter security dimension, in various arrangements, the perimeter security dimensions are based on the communication endpoints of the entity detected via scanning and/or other forms of intelligence gathering. Communication endpoints can be domains, sub-domains, IP addresses, or ports that are constructs that identify specific processes or a types of network service. Communication endpoints can be protocol specific (e.g., transmission control protocol (TCP), user datagram protocol (UDP)) and assigned an address combination. The address combination may include a 16- or 128-bit unsigned number representing an IPv4 or IPv6 IP address and another 16-bit unsigned number commonly referred to as "port number." Port numbers can be divided into ranges (e.g., well-known ports, registered ports, and dynamic or private ports) and assigned numbers accordingly. For example, File Transfer Protocol (FTP) Data Transfer may be port number: 20, Secure Shell (SSH) Secure Login may be port number: 22, Domain Name System (DNS) service may be port number: 53, Dynamic Host Configuration Protocol (DHCP) may be port number: 67 and 68, Hypertext Transfer Protocol (HTTP) may be port number: 80. In various arrangements, entities can electronically transmit and receive network packets (e.g., formatted units of data, sometimes referred to as the payload) via communication endpoints of the entity. That is, the entity can utilize communication endpoints on computer hardware (e.g., computing devices, servers, databases, processing circuits, Internet of things (IoT) devices) as an interface between the entities computer hardware and other computer hardware and/or peripheral devices (e.g., via network 130 in FIG. 1**). In various arrangements, one or more communication endpoints can be closed (sometimes referred to as disabled) such that the interface of various port numbers cannot be utilized. In some arrangements, one or more communications endpoints can be open (sometimes referred to as enabled) such that communication interfaces corresponding to various port numbers can be utilized.

Each communication endpoint, such as ports, can be subject to cybersecurity incidents. In particular, some ports may be more vulnerable (e.g., critical ports) and/or prone than other ports to cyber-incidents. Accordingly, the perimeter security dimension can be based on open, closed and/or filtered communication endpoints of entities.

Expanding generally on the technology security dimension, in various arrangements, the technology security dimension is based on technologies and frameworks utilized by the entity. Technologies can comprise any computing device and/or software application utilized by the entity to perform and execute various functions on various computing devices. Frameworks (sometimes referred to as software frameworks) can be any type of support programs, compilers, code libraries, tools sets, and/or application programming interfaces (APIs) utilized by the entity. Various software frameworks can include AJAX framework, web framework, middleware, application framework, enterprise architecture framework, decision support systems, computer added design software, and application development framework. In some arrangements, entities can utilize various technologies and frameworks in a computer network environment. In various arrangements, various technologies and frameworks can be subject to cybersecurity incidents (e.g., past cyber-incidents, detected vulnerabilities, based on end of life, current events). In particular, certain technologies and frameworks may be more vulnerable than others to cyber-incidents. Accordingly, the technology security dimension is based on computing devices, software applications, and software frameworks utilized by the entity.

Expanding generally on the intelligence security dimension, in various arrangements, the intelligence security dimension is based on public and private content associated with the entity. Public content may include any content accessible on the world wide web (www), Internet, television, radio, public communication, production software, and newspaper or magazine. Private content may include sensitive data, confidential data, financial data, encrypted data, beta software and private communication data. In various arrangements, various services and sources can be complied into a list of known IP addresses and hosts that include public and private content. In some arrangements, entities can provide content (e.g., news articles) to the public and/or provide content (e.g., financial data, sensitive data) privately to internal or external entities. In various arrangements, other entities that are not the scanned entity can provide content to the public and/or provide content privately to internal or external entities associated with the scanned entity. In various arrangements, various content can be indicative of cybersecurity vulnerabilities and/or threats. In particular, certain content may be indicative of specific vulnerabilities and/or threats to the entity that may result in cyber-incidents. Accordingly, the intelligence security dimension is based on various public and private content.

Expanding generally on the security controls dimension, in various arrangements, the security controls dimension is based on mitigation techniques utilized by the entity. Mitigation techniques can include various software and/or hardware implemented by the entity for mitigating cybersecurity vulnerabilities and threats, proactively increasing cybersecurity, and reducing the likelihood of a cyber-incident. While mitigation techniques may not eliminate all cyber-incidents, they can provide extra layers of security against cyber-incidents (e.g., improved protection). Some mitigation techniques can include implementing antivirus and antispyware software, implementing employee training in cyber security principles, implementing one or more firewalls, updating software and operating systems as they become available, implementing backup systems, implementing access control to physical buildings, computers and network components, implementing secure Wi-Fi networks, implementing virtual data and information access controls, and implementing the changing of passwords frequently. In some arrangements, entities can implement various mitigation techniques. In various arrangements, various mitigation techniques can be indicative of reduced cybersecurity vulnerabilities and/or threats. In particular, certain mitigation techniques may provide enhanced cybersecurity to the entity. Accordingly, the security controls dimension is based on various software, hardware, policies and procedures implemented by the entity to proactively increase cybersecurity and mitigate cybersecurity vulnerabilities and/or threats. In various arrangements, there may be fewer or additional dimensions based on various factors and preferences. For example, a cybersecurity dimension may include a third-party security dimension based on third-party cybersecurity, where the third-parties are entities that communicate and/or provide services or products to the entity.

In one example, the one or more processing circuits of the security metrics model 520 can receive Institution J data (e.g., entity data) from data sources 535, via the T&S data channels 530, and over the data channel communication networks (e.g., 515*b*, 515*d*, 515*f*). In this example, data sources such as ransomware data sources, phishing data sources, blacklists data sources, and financial risk data sources, can store and/or provide Institution J data to the security metrics model 520. Further in this example, each data channel communication network may connect and facilitate the exchange of data between the data channels 530 and the security metrics model 520 over a network (e.g., network 130). In some arrangements, each data channel of the T&S data channels 530 can be communicatively coupled to a specific data source of the data sources 535 (e.g., data channel W can be communicatively coupled to geographic data source X). In various arrangements, each data channel of the T&S data channels 530 can be communicatively coupled to a plurality of data source of the data sources 535 (e.g., data channel Y can be communicatively coupled to geographic data source X and industry risk data source Z).

In another example, the one or more processing circuits of the security metrics model 520 can receive Institution J data (e.g., entity data) from data sources 505, via the attack surface data channels 525, and over the data channel communication networks (e.g., 515*a*, 515*c*, 515*e*). In this example, data sources such as service provider email data sources, service provide Internet service provider data sources, can store and/or provide Institution J data to the security metrics model 520. Further in this example, each data channel communication network may connect and facilitate the exchange of data between the data channels 525 and the security metrics model 520 over a network (e.g., network 130). In some arrangements, each data channel of the attack surface data channels 525 can be communicatively coupled to a specific data source of the data sources 505 (e.g., data channel K can be communicatively coupled to service provider email data source L). In various arrangements, each data channel of the attack surface data channels 525 can be communicatively coupled to a plurality of data source of the data sources 505 (e.g., data channel K can be communicatively coupled to service provider email data source L and service provide Internet service provider data source M).

In yet another example, the one or more processing circuits of the security metrics model 520 can receive Institution J data (e.g., entity data) from data sources 510, via the attack surface data channels 525, and over the data channel communication networks (e.g., 515*a*, 515*c*, 515*e*). In this example, data sources such as system 1, system 2, system 3, can store and/or provide Institution J data to the security metrics model 520. Further in this example, each data channel communication network may connect and facilitate the exchange of data between the data channels 525 and the security metrics model 520 over a network (e.g., network 130). In some arrangements, each data channel of the attack surface data channels 525 can be communicatively coupled to a specific data source of the data sources 510. In various arrangements, each data channel of the attack surface data channels 525 can be communicatively coupled to a plurality of data source of the data sources 510.

In various arrangements, one or more processing circuits of the security metrics model 520 can generate cybersecurity risk scores (e.g., perimeter security, technology security, intelligence security, security controls) and a multi-dimensional score. The one or more processing circuits of the security metrics model 520 can utilize the generated scores to generate cybersecurity dashboards, cybersecurity reporting, remediation items, and detailed reports.

In various arrangements, cybersecurity reporting can include one or more processing circuits of the security metrics model 520 being structured to provide notifications and/or messages to entities based on the generated scores and/or vulnerabilities. Providing a notification and/or message can include email, text message, phone call, mail, fax, online notification, website notification (e.g., via the dashboard described herein), alert, and/or a combination of some, getting transmitted over a network (e.g., network 130 in FIG. 1). In some arrangement, the notification may include a detailed report including remediation items, historical data, and/or trends. The detailed report can contain various data based on the analyses performed by the one or more processing circuits of security metrics model 520 (e.g., resembles similar features and functionality of modeler 116 in FIG. 1). The detailed report can include cybersecurity risk scores (e.g., intelligence, perimeter, technology, security controls), multi-dimensional scores, remediation items, remediation actions, security reports, data analytics, graphs, charts, historical data, historical trends, vulnerabilities, summaries, help information, domain information, subdomain information, and/or any other properties parsed from device connectivity data, IP traffic data, etc. In various arrangements, the detailed report may be presented on a computer device (e.g., mobile phone screen, monitor, display, smart watch, smart device). The information can be grouped, filtered and/or sorted via various characteristics, including line-of-business, relationship-type, business function, criticality, geographic footprint, relationship-owner.

In various arrangements, cybersecurity reporting can include one or more processing circuits of the security metrics model 520 being structured to provide notifications and/or messages to entities based on the generated scores and/or vulnerabilities and/or based on selectable policy criteria, such as SLAs, vulnerability-status, cyber risk scores, etc. Providing a notification and/or message can include email, text message, phone call, mail, fax, online notification, website/dashboard notification, alert, and/or a combination of some, getting transmitted over a network (e.g., network 130 in FIG. 1).

Referring now to FIG. 6, an example illustration of a plurality of scoring tables and a visibility table is shown, according to some arrangements. As shown, the plurality of scoring tables (e.g., 605, 610, 615, and 620) includes items (sometimes referred to herein as "items of impact"), a dimension, and a value (sometimes referred to herein as "impact"). Also as shown, the visibility table includes items and discovered instances of the specific items. The calculation of values and identification of items and instances is described above in detail with reference to FIG. 1.

Figure 7:
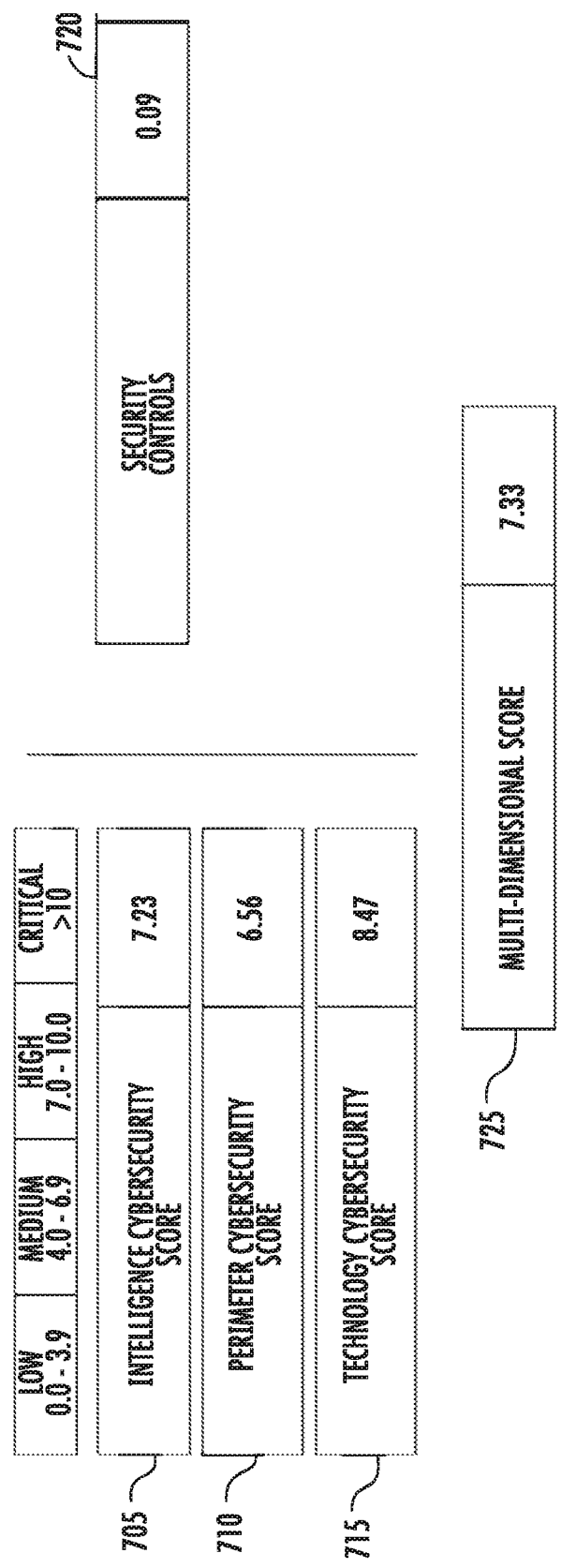
FIG. 7 is an example illustration of security model scoring, according to some arrangements.

Referring now to FIG. 7, an example illustration of security model scoring is shown, according to some arrangements. As shown, a plurality of cybersecurity risk scores by dimension (e.g., 705, 710, 715, and 720) can be aggregated to generate a multi-dimensional score 725. The generation of the multi-dimensional score and cybersecurity risk scores is described above in detail with reference to FIG. 1.

Figure 8:
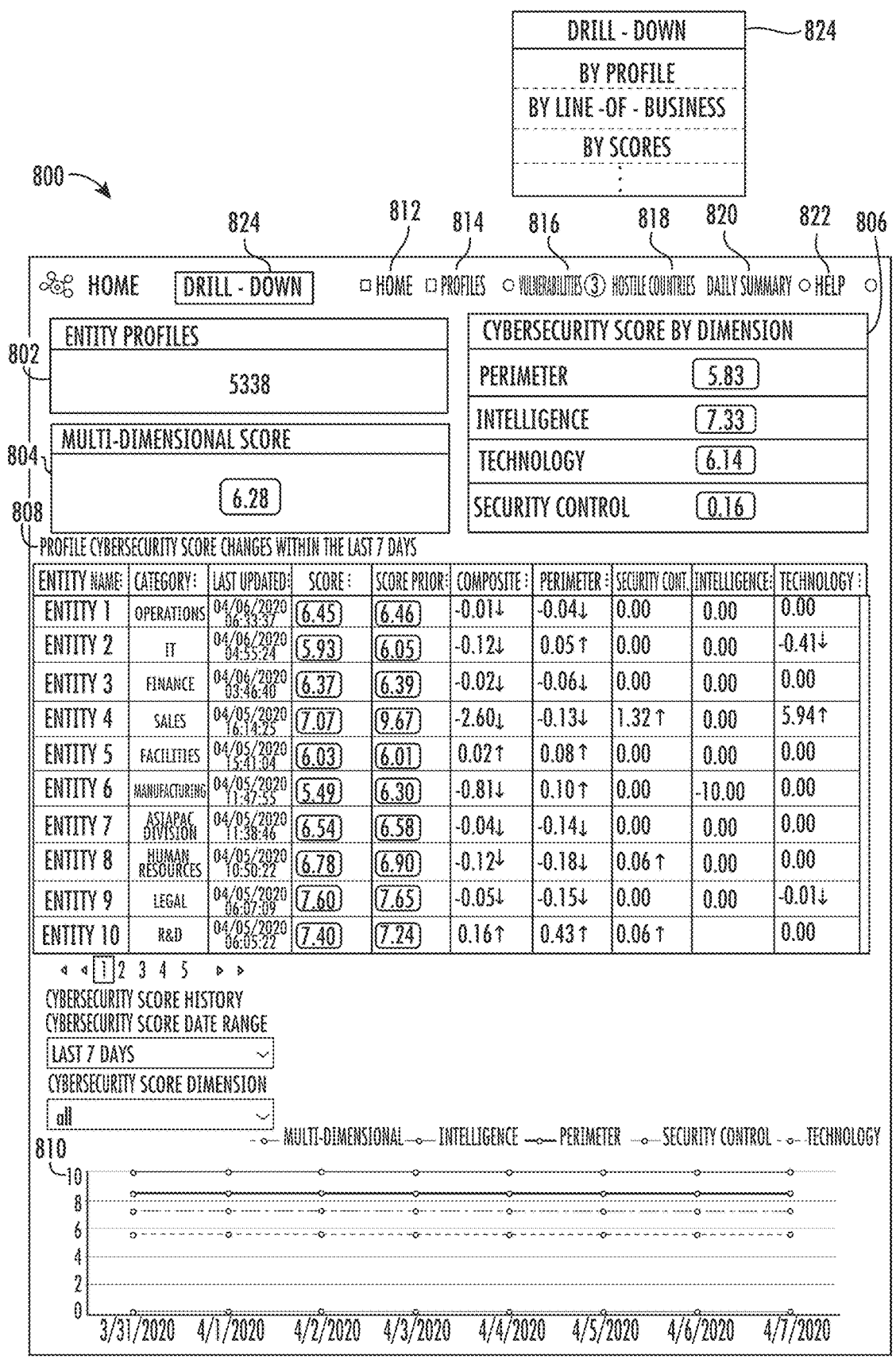
FIG. 8 is an example illustration of an arrangement of a user-interactive graphical user interface, according to some arrangements.

Referring now to FIG. 8, an example illustration of an arrangement of a user-interactive graphical user interface 800 (collectively referred to herein as "user-interactive interface 800") is shown, according to some arrangements. Generally, a user-interactive interface 800 can be rendered at a computing device (e.g., user devices 140, entity devices 150, third-party devices 155) to facilitate interactions and analyze various entity data, cybersecurity risk scores, performance metrics, trends, tracking, remediation items, associated with one or more entity profiles. In various arrangements, the user-interactive interface 800 can be generated, updated and/or monitored by the content management system 170 shown in FIG. 1. The user-interactive interface 800 can include a plurality of interfaces (e.g., sometimes referred to herein as a "dashboards") and objects. For example, the multi-channel cybersecurity assurance system 110 can execute operations to provide the user-interactive interface 800 with at least one entity profiles panel 802, at least one multi-dimensional score panel 804, at least one cybersecurity risk score by dimension panel 806, at least one profile cybersecurity risk score trends panel 808, at least one graphical trends panel 810, at least one navigation button (e.g., 812, 814, 816, 818, 820, and 822), and a drill button 824, where each panel may include a plurality of sub-panels. In some arrangements, each panel within the user-interactive interface 800 operates by receiving input from an input device (e.g., a pointing device, a keyboard, a touchscreen, tactile feedback, or another form of input device). In response, the computing device executing the user-interactive interface 800 may request data such as profile trends from a database (e.g., multi-channel cybersecurity assurance vault 120, in particular, entity datasets 122 in FIG. 1) corresponding to the multi-channel cybersecurity assurance system 110, via the network 130. In various arrangements, the computing device executing operations to generate and display the user-interactive interface 800 may request data such as profile trends from a data storage unit of the computing device. In some arrangements, the user of user-interactive interface 800 can modify the colors of items, highlight items, zoom in/out, customize the look and feel of the user-interface interface 800. In some arrangements, the user of user-interactive interface 800 may dynamically (or automatically) modify the colors of items, highlight items, zoom in/out, customize the look and feel of the user-interface interface 800, without receiving user input.

The user-interactive interface 800 can execute at the multi-channel cybersecurity assurance system 110, user devices 140, entity devices 150, third-party devices 155, or some or all of these to provide the user-interactive interface 800. In some arrangements, the user-interactive interface 800 can be provided within a web browser. In various arrangements, the multi-channel cybersecurity assurance system 110 executes to provide the user-interactive interface 800 at the computing devices (e.g., 140, 150, 155 in FIG. 1) without utilizing the web browser. In one arrangement, an application executed by an entity device (e.g., entity devices 150) can cause the user-interactive interface 800 to present on a monitor, screen, or projection surface/device of the entity device.

In various arrangements, the user-interactive interface 800 can include the drill-down button 824 that can include drill-down functionality such that data presented on the user-interactive interface 800 can be broken down and magnified. In various arrangements, in response to the selection of the drill-down button 824, a drop-down menu can be displayed such that a user can select a plurality of drill-down options. For example, the user-interactive interface 800 can be drilled-down by profile (e.g., as shown). In another example, the user-interactive interface 800 can be drilled-down by line-of-business such that specific profiles can be displayed based on one or more parameters indicative of one or more lines-of-business. In yet another example, the user-interactive interface 800 can be drilled-down by score such that specific profiles can be displayed based on a cybersecurity risk score and/or multi-dimensional score.

In some arrangements, the user-interactive interface 800 can include the entity profiles panel 802 that can include the number of entity profiles stored in the entity datasets 122 of FIG. 1. In some arrangements, the number may be based on specific entities that have been drilled down on (e.g., via drill-down button 824). For example, a user of the user-interactive interface 800 may drill-down to a particular line-of-business of specific entities. In this example, the entity profiles panel 802 could update based on the number of entity profiles that are included in that particular line-of-business.

In various arrangements, the user-interactive interface 800 can include the multi-dimensional score panel 804 that can include an average of all the entity profile multi-dimensional scores. In some arrangements, the average may be based on specific entities that have been drilled down on (e.g., via drill-down button 824). For example, a user of the user-interactive interface 800 may drill-down to a particular multi-dimensional score of the consumer goods industry. In this example, the multi-dimensional score panel 804 can be updated based on the average of all the entity profiles multi-dimensional scores in the consumer goods industry.

In some arrangements, the user-interactive interface 800 can include the cybersecurity risk score by dimension panel 806 that can include an average of all the entity profile cyber-security scores by dimension. In some arrangements, the average may be based on specific entities that have been drilled down on (e.g., via drill-down button 824). For example, a user of the user-interactive interface 800 may-drill down to a specific entity. In this example, the cyber-security risk score by dimension panel 806 could update based on the cyber-security scores by dimension of the specific entity.

In various arrangements, the user-interactive interface 800 can include the cybersecurity risk score trends panel 808 that can include a list of entities (sometimes referred to as "vendors" or "partners") and some entity data associated with each entity (e.g., category, last updated, score, score prior, composite, perimeter, security, intelligence, technology). In various arrangements, any list of grouped profiles and/or features of entity profiles can be displayed. The cybersecurity risk score trends panel 808 can include trend information and recent changes to various entity profiles such as cybersecurity risk scores, multi-dimensional scores, remediation items, vulnerabilities.

In some arrangements, the user-interactive interface 800 can include the cybersecurity risk score by graphical trends panel 810 that can include a graphical representation of trends of a multi-dimensional score and cybersecurity risk scores. The trends can be long-term trends that represent cybersecurity over a period of time (e.g., last 7 days, last month, last 5 minutes). In various arrangements, a user can modify the graphical trends panel 810 utilizing the various input options (e.g., cybersecurity risk score history, cyber-security risk score date range, cybersecurity risk score dimension) such that the graphical representations can update in response to input by the user. In some arrangements, the graphic trends can display trends in remediation items, trends in vulnerabilities, trends in data fusion operation process. In various arrangements, the graphic trends panel 810 can be modified by clicking and dragging, dropping, inserting, or removal operations to one or more areas of the graphic trends panel 810.

In various arrangements, the user-interactive interface 800 can include navigation buttons that can include a home button 812, a profiles button 814, a vulnerabilities button 816, a hostile countries button 818, a daily summary button 820, and a help button 822. In some arrangements, each button can provide navigation to additional graphical user interfaces of the user-interactive interface 800. The home button 812, when selected, can cause the user-interface interface 800 to update and display the home screen. The profiles button 814, when selected, can cause the user-interface interface 800 to display a drop-down menu that enables the selection of various profiling features. For example, a user can browse profiles such that a list of all profiles is displayed, create profiles such that a new profile can be created, search profiles such that profiles can be searched by letters, numbers, and/or special characters, and profiles by line-of-business such that profiles can be displayed (and sometimes sorted) by line-of-business. The vulnerabilities button 816, when selected, can cause the user-interface interface 800 to update and display all known vulnerabilities. The hostile countries button 818, when selected, can cause the user-interface interface 800 to update and display list and/or graphical representation of a map of hostile countries based on a plurality of data (e.g., governmental databases, user designation, entity profile data, network traffic). The daily summary button 820, when selected, can cause the user-interface interface 800 to update and display a daily summary of some or all entity profiles. The daily summary may be customized by user such that it is user specific and can display summarized data. The help button 812, when selected, can cause the user-interface interface 800 to update and display a help screen.

In some arrangements, updates to the user-interactive interface 800 based on received input of a user can be replicated throughout the panel. For example, if a user drills-down (e.g., via drill-down button 824) the entity profiles panel 802, to display vendor profiles in the financial industry, the multi-dimensional score panel 804, cybersecurity risk score by dimension panel 806, profile cybersecurity risk score trends panel 808, and graphical trends panel 810, may update as well. Accordingly, each input received at any panel and/or button can cause one or more updates to the user-interactive interface 800. In various arrangements, the user-interactive interface 800 can update based on real-time multi-channel data fusion operations and analysis by the multi-channel cybersecurity assurance system 110 in FIG. 1 (e.g., updated cybersecurity risk score, updated multi-dimensional score, new entity profile, new vulnerability, new remediation item).

Figure 9:
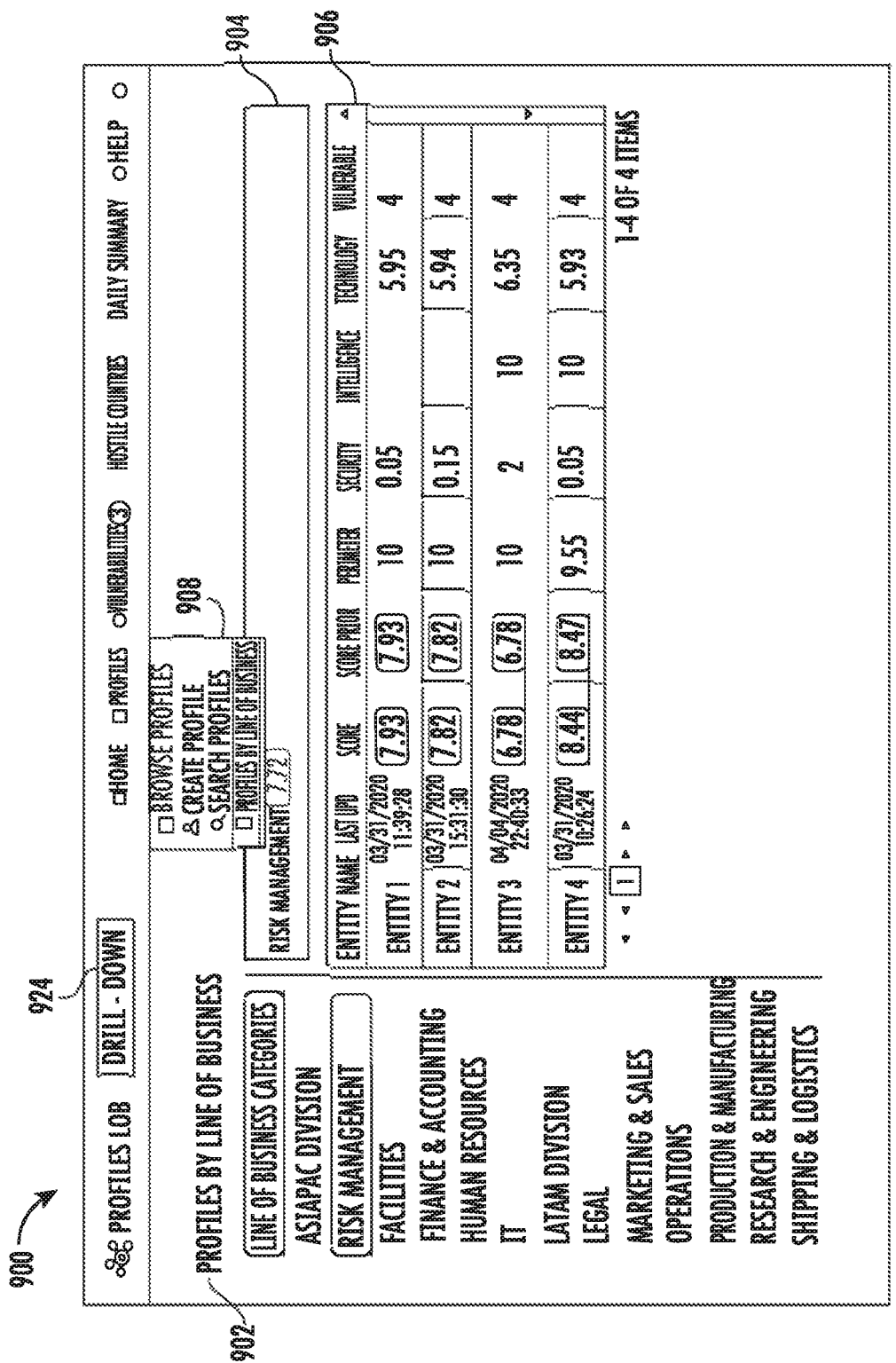
FIG. 9 is an example illustration of an arrangement of a user-interactive graphical user interface, according to some arrangements.

Referring now to FIG. 9, an example illustration of an arrangement of a user-interactive graphical user interface 900 (collectively referred to herein as "user-interactive interface 900") is shown, according to some arrangements. The user-interactive interface 900 comprises features and functionality described in detail with reference to FIG. 8. As shown, the user-interactive interface 900 can include a profile by line-of-business dashboard 902 such that line-of-business can be drilled-down on (e.g., utilizing the drop-down menu 908 and/or drill-down button 924). As shown, the line-of-business multi-dimensional score panel 904 displays the multi-dimensional score based on the line-of-business of one or more entity profiles. Also as shown, the line-of-business cybersecurity risk score trends panel 906 can include a list of entities (sometimes referred to as "vendors") and some entity data associated with each entity (e.g., category, last updated, score, score prior, composite, perimeter, security, intelligence, technology). In various arrangements, any list of grouped profiles and/or features of entity profiles can be displayed. The line-of-business cybersecurity risk score trends panel 906 can include trend information and recent changes to various entity profiles such as cybersecurity risk scores, multi-dimensional scores, remediation items, vulnerabilities. Further as shown, the drop-down menu 908 can include various navigational options such as browse profiles such that a list of all profiles is displayed, create profiles such that a new profile can be created, search profiles such that profiles can be searched by letters, numbers, and/or special characters, and profiles by line-of-business such that profiles can be displayed (and sometimes sorted) by line-of-business (as shown).

Figure 10:
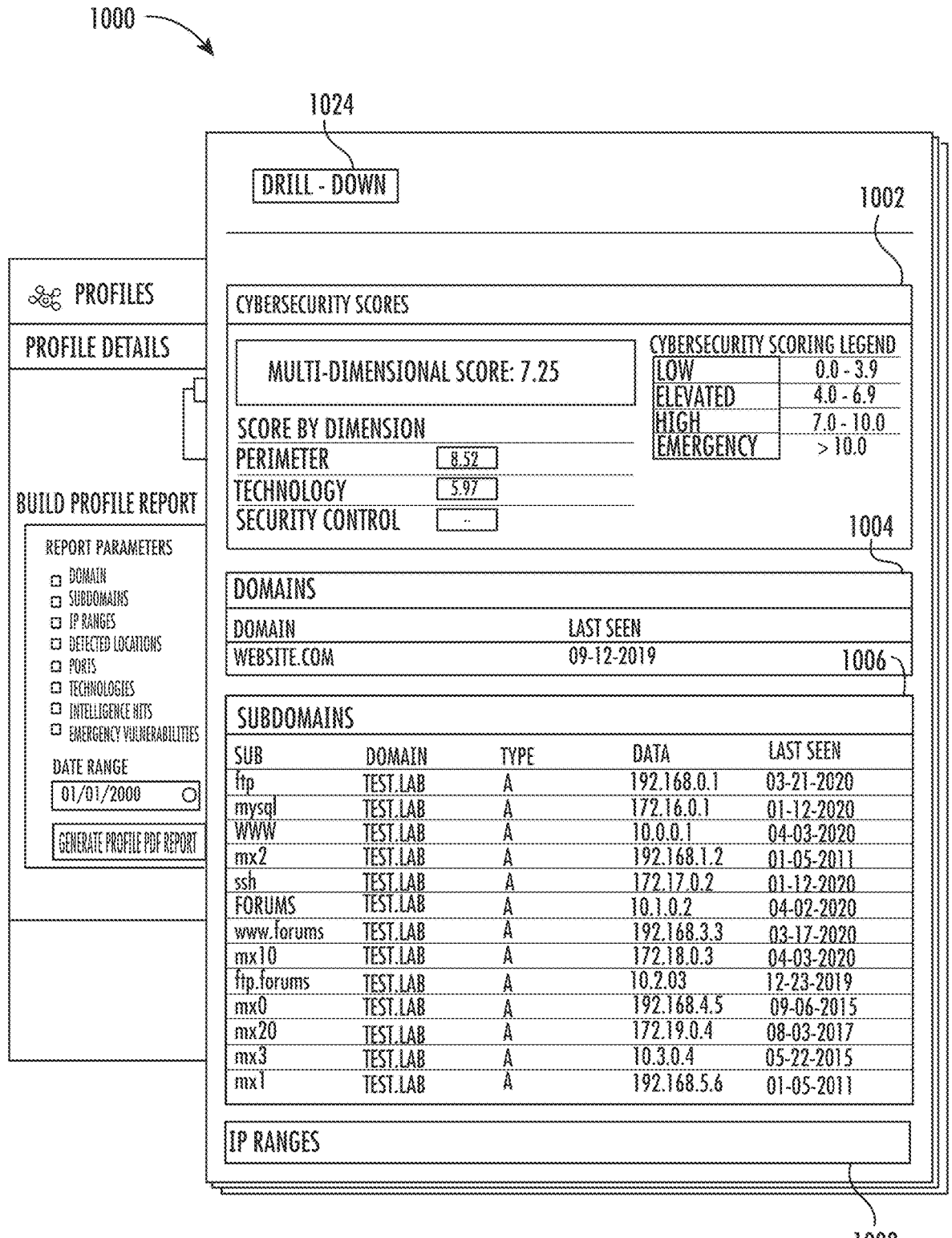
FIG. 10 is an example illustration of an arrangement of a user-interactive graphical user interface, according to some arrangements.

Referring now to FIG. 10, an example illustration of an arrangement of a user-interactive graphical user interface 1000 (collectively referred to as "user-interactive interface 1000") is shown, according to some arrangements. The user-interactive interface 1000 resembled similar features and functionality described in detail with reference to FIGS. 8-9. As shown, the user-interactive interface 1000 can include a profile specific dashboard that includes profile cybersecurity risk scores panel 1002, profile domains panel 1004, profile subdomains panel 1006, profile IP ranges 1008, and a drill-down button 1024. As shown, a profile can be associated with various domains, subdomains, and IP ranges such that entity data can be received, collected, and scanned based on analyzing the various domains, subdomains, and IP ranges. The multi-channel data fusion operations are explained in detail with reference to FIG. 1. In various arrangements, the user-interactive interface 1000 can display vulnerabilities and remediation items of the specific profile and provide metrics (e.g., graphs, tables) based on the number of vulnerabilities, remediation items, and the historical and trend information of them.

Figure 11:
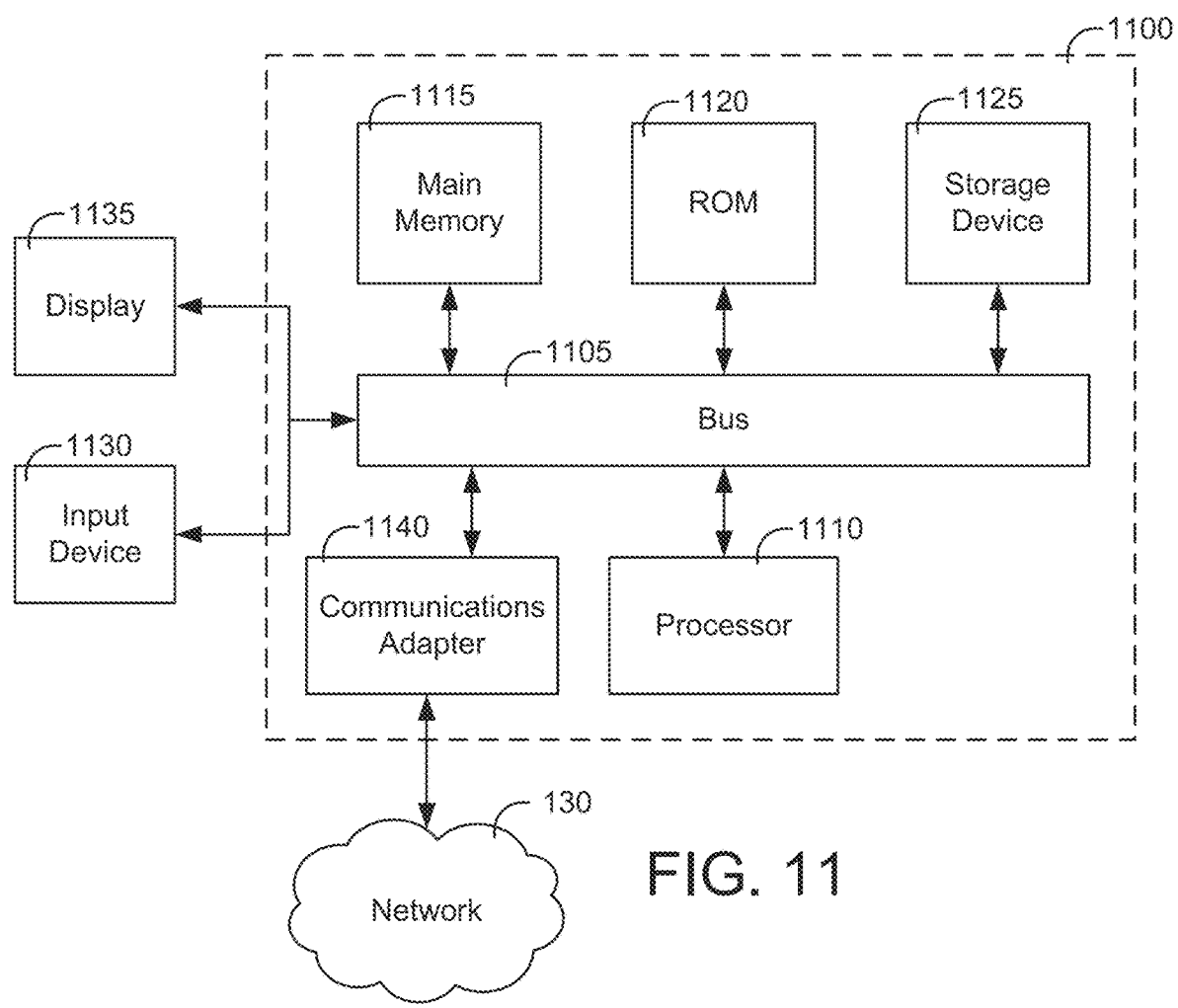
FIG. 11 is a block diagram illustrating an example computing system suitable for use in the various arrangements described herein.

Referring now to FIG. 11, a depiction of a computer system 1100 is shown. The computer system 1100 that can be used, for example, to implement a computing environment 100, multi-channel cybersecurity assurance system 110, user devices 140, entity devices 150, third-party devices 155, data sources 160, content management system 170, and/or various other example systems described in the present disclosure. The computing system 1100 includes a bus 1105 or other communication component for communicating information and a processor 1110 coupled to the bus 1105 for processing information. The computing system 1100 also includes main memory 1115, such as a random-access memory (RAM) or other dynamic storage device, coupled to the bus 1105 for storing information, and instructions to be executed by the processor 1110. Main memory 1115 can also be used for storing position information, temporary variables, or other intermediate information during execution of instructions by the processor 1110. The computing system 1100 may further include a read only memory (ROM) 1120 or other static storage device coupled to the bus 1105 for storing static information and instructions for the processor 1110. A storage device 1125, such as a solid-state device, magnetic disk or optical disk, is coupled to the bus 1105 for persistently storing information and instructions.

The computing system 1100 may be coupled via the bus 1105 to a display 1135, such as a liquid crystal display, or active matrix display, for displaying information to a user. An input device 1130, such as a keyboard including alpha-numeric and other keys, may be coupled to the bus 1105 for communicating information, and command selections to the processor 1110. In another arrangement, the input device 1130 has a touch screen display 1135. The input device 1130 can include any type of biometric sensor, a cursor control, such as a mouse, a trackball, or cursor direction keys, for communicating direction information and command selections to the processor 1110 and for controlling cursor movement on the display 1135.

In some arrangements, the computing system 1100 may include a communications adapter 1140, such as a networking adapter. Communications adapter 1140 may be coupled to bus 1105 and may be configured to enable communications with a computing or communications network 130 and/or other computing systems. In various illustrative arrangements, any type of networking configuration may be achieved using communications adapter 1140, such as wired (e.g., via Ethernet), wireless (e.g., via WiFi, Bluetooth), satellite (e.g., via GPS) pre-configured, ad-hoc, LAN, WAN.

According to various arrangements, the processes that effectuate illustrative arrangements that are described herein can be achieved by the computing system 1100 in response to the processor 1110 executing an arrangement of instructions contained in main memory 1115. Such instructions can be read into main memory 1115 from another computer-readable medium, such as the storage device 1125. Execution of the arrangement of instructions contained in main memory 1115 causes the computing system 1100 to perform the illustrative processes described herein. One or more processors in a multi-processing arrangement may also be employed to execute the instructions contained in main memory 1115. In alternative arrangements, hard-wired circuitry may be used in place of or in combination with software instructions to implement illustrative arrangements. Thus, arrangements are not limited to any specific combination of hardware circuitry and software.

That is, although an example processing system has been described in FIG. 11, arrangements of the subject matter and the functional operations described in this specification can be carried out using other types of digital electronic circuitry, or in computer software (e.g., application, blockchain, distributed ledger technology) embodied on a tangible medium, firmware, or hardware, including the structures disclosed in this specification and their structural equivalents, or in combinations of one or more of them. Arrangements of the subject matter described in this specification can be implemented as one or more computer programs, e.g., one or more subsystems of computer program instructions, encoded on one or more computer storage medium for execution by, or to control the operation of, data processing apparatus. Alternatively, or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

Although shown in the arrangements of FIG. 11 as singular, stand-alone devices, one of ordinary skill in the art will appreciate that, in some arrangements, the computing system 1100 may comprise virtualized systems and/or system resources. For example, in some arrangements, the computing system 1100 may be a virtual switch, virtual router, virtual host, virtual server. In various arrangements, computing system 1100 may share physical storage, hardware, and other resources with other virtual machines. In some arrangements, virtual resources of the network 130 (e.g., network 130 of FIG. 1) may include cloud computing resources such that a virtual resource may rely on distributed processing across more than one physical processor, distributed memory, etc.

As used herein, the term "resource" refers to a physical or virtualized (for example, in cloud computing environments) computing resource needed to execute computer-based operations. Examples of computing resources include computing equipment or device (server, router, switch, etc.), storage, memory, executable (application, service, and the like), data file or data set (whether permanently stored or cached), and/or a combination thereof (for example, a set of computer-executable instructions stored in memory and executed by a processor, computer-readable media having data stored thereon)

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. A system comprising:
    a plurality of data channels configured to access entity data;
    a data channel communication network configured to communicate the entity data from the plurality of data channels;
    a plurality of data sources configured to store the entity data, the plurality of data sources comprising a data source associated with a data channel of the plurality of data channels;
    a processing circuit communicatively coupled to the data channel via the data channel communication network, the processing circuit configured to:
        receive, via the data channel, the entity data comprising device connectivity data;
        parse a first property and a second property from the device connectivity data;
        identify a first vulnerability associated with the first property and the second vulnerability associated with a second property;
        determine a first impact of the first vulnerability and a second impact of the second vulnerability;
        assign the first property to a first cybersecurity dimension and the second property to a second cybersecurity dimension;
        generate a first cybersecurity risk score based at least on the first impact of the first vulnerability, wherein the first cybersecurity risk score relates to the first cybersecurity dimension;
        generate a second cybersecurity risk score based at least on the second impact of the second vulnerability, wherein the second cybersecurity risk score relates to the second cybersecurity dimension; and
        generate a multi-dimensional score for a target computer network environment based on aggregating the first cybersecurity risk score and the second cybersecurity risk score.

2. The system of claim 1, the processing circuit further configured to parse from the device connectivity data at least one of a device property, a network property, and network information.

3. The system of claim 2, the processing circuit further configured to analyze Internet protocol (IP) traffic associated with the target computer network environment.

4. The system of claim 1, the processing circuit further configured to:
    update the entity data based on receiving additional data via at least some of the plurality of data channels;
    analyze the updated entity data to identify new device connectivity data;
    generate an updated cybersecurity risk score based on the new device connectivity data; and
    generate an updated multi-dimensional score based on the updated cybersecurity risk score.

5. The system of claim 4, wherein generating the updated cybersecurity risk score occurs at least in part contemporaneously with updating the entity data.

6. The system of claim 4, wherein generating the updated cybersecurity risk score is based on a change in one or more property of the device connectivity data, the change corresponding to a predetermined period of time.

7. The system of claim 1, wherein detecting the first vulnerability is based on a security parameter.

8. The system of claim 7, wherein the first impact of the first vulnerability is based on at least one of a number of occurrences associated with the first vulnerability and a line-of-business of an entity.

9. The system of claim 1, the processing circuit further configured to:
receive, via a computing device of a partner institution of an entity, a customization parameter;
generate a user-interactive cybersecurity dashboard based on the entity data and the customization parameter, wherein the user-interactive cybersecurity dashboard comprises a graphical user interface;
provide to the computing device of the partner institution the user-interactive cybersecurity dashboard, wherein the user-interactive cybersecurity dashboard is presented on a display of the computing device and comprises a selectable drill-down option;
receive, via the user-interactive cybersecurity dashboard, a selection of the selectable drill-down option; and
in response to receiving the selection, update the user-interactive cybersecurity dashboard based on the entity data and the selection.

10. The system of claim 9, wherein providing the user-interactive cybersecurity dashboard further comprises indicating a remediation item for the entity to remediate, and wherein the remediation item corresponds to a detected vulnerability.

11. The system of claim 10, the processing circuit further configured to:
track progress of the remediation item based at least on periodically scanning the plurality of data channels; and
generate a long-term trend summary associated with the entity and based on detected vulnerabilities and progress of the remediation item, wherein the long-term trend summary is added to the user-interactive cybersecurity dashboard.

12. The system of claim 1, wherein the first cybersecurity dimension is at least one of a technology security dimension, a perimeter security dimension, an intelligence security dimension, and a security controls dimension.

13. The system of claim 1, wherein aggregating the first cybersecurity risk score and the second cybersecurity risk score further comprises:
calculate a roll-up score; and
adjust the roll-up score based on determining a mitigating security score, wherein the mitigating security score is based on at least one identified mitigation technique to reduce vulnerabilities, and wherein the identified mitigation technique is identified by analyzing the entity data.

14. A method of analyzing multi-channel data based on a security model in a computer network environment, the method comprising:
receiving, by a processing circuit, entity data comprising device connectivity data;
analyzing, by the processing circuit, the device connectivity data, comprising assigning a property of the device connectivity data to a specific cybersecurity dimension of a plurality of cybersecurity dimensions based on correlating the property to a vulnerability;
generating, by the processing circuit, a first cybersecurity risk score based at least on the vulnerability, wherein the first cybersecurity risk score is associated with a first cybersecurity dimension; and
generating, by the processing circuit, a multi-dimensional score based on aggregating the first cybersecurity risk score with a second cybersecurity risk score associated with a second cybersecurity dimension.

15. The method of claim 14, further comprising:
parsing from the device connectivity data at least one of a device property, network property, and network information.

16. The method of claim 15, further comprising analyzing IP traffic associated with at least one of a domain and a subdomain of a target computer network environment.

17. The method of claim 14, further comprising:
updating the entity data based on receiving additional data;
analyzing the updated entity data to identify new device connectivity data;
generating an updated cybersecurity risk score based on the new device connectivity data; and
generating an updated multi-dimensional score based on the updated cybersecurity risk score.

18. The method of claim 14, further comprising:
receiving, via a computing device of a partner institution of an entity, a customization parameter;
generating a user-interactive cybersecurity dashboard based on the entity data and the customization parameter, wherein the user-interactive cybersecurity dashboard comprises a graphical user interface;
providing to the computing device of the partner institution the user-interactive cybersecurity dashboard, wherein the user-interactive cybersecurity dashboard is presented on a display of the computing device and comprises a selectable drill-down option;
receiving, via the user-interactive cybersecurity dashboard, a selection of the selectable drill-down option; and
in response to receiving the selection, updating the user-interactive cybersecurity dashboard based on the entity data and the selection.

19. The method of claim 18, further comprising:
determining a remediation item;
tracking progress of the remediation item based at least on periodically scanning a plurality of data channels; and
generating a long-term trend summary associated with the entity and based on detected vulnerabilities and progress of the remediation item, wherein the long-term trend summary is added to the user-interactive cybersecurity dashboard.

20. A computer-readable storage medium (CRM) having instructions stored thereon that, when executed by a processing circuit, cause the processing circuit to perform operations comprising:
receiving, by the processing circuit, entity data comprising device connectivity data;
analyzing, by the processing circuit, the device connectivity data, comprising assigning a property of the device connectivity data to a specific cybersecurity dimension of a plurality of cybersecurity dimensions based on correlating the property to a vulnerability;
generating, by the processing circuit, a first cybersecurity risk score based at least on the vulnerability, wherein the first cybersecurity risk score is associated with a first cybersecurity dimension; and
generating, by the processing circuit, a multi-dimensional score based on aggregating the first cybersecurity risk score with a second cybersecurity risk score associated with a second cybersecurity dimension.

* * * * *